United States Patent
Johnston et al.

(10) Patent No.: US 11,351,859 B2
(45) Date of Patent: Jun. 7, 2022

(54) ELECTRONIC INTEGRATED WHEEL END DISCONNECT FOR AUTOMOTIVE APPLICATION

(71) Applicant: ILJIN USA Corporation, Novi, MI (US)

(72) Inventors: Corbin Johnston, Winnipeg (CA); Richard Haehn, Bloomfield Hills, MI (US); Jong Hyung Seo, Novi, MI (US)

(73) Assignee: ILJIN USA Corporation, Novi, MI (US)

( * ) Notice: Subject to any disclaimer, the term of this patent is extended or adjusted under 35 U.S.C. 154(b) by 190 days.

(21) Appl. No.: 16/576,307

(22) Filed: Sep. 19, 2019

(65) Prior Publication Data
US 2020/0094675 A1    Mar. 26, 2020

Related U.S. Application Data

(60) Provisional application No. 62/734,498, filed on Sep. 21, 2018.

(51) Int. Cl.
| | |
|---|---|
| *B60K 17/354* | (2006.01) |
| *B60K 17/35* | (2006.01) |
| *B60K 23/08* | (2006.01) |
| *B60K 17/356* | (2006.01) |
| *F16D 28/00* | (2006.01) |
| *F16D 23/12* | (2006.01) |
| *F16D 27/01* | (2006.01) |
| *F16D 27/108* | (2006.01) |
| *B60K 17/344* | (2006.01) |

(Continued)

(52) U.S. Cl.
CPC ........ *B60K 17/3515* (2013.01); *B60K 17/344* (2013.01); *B60K 17/354* (2013.01); *B60K 17/356* (2013.01); *B60K 23/08* (2013.01); *F16D 23/12* (2013.01); *F16D 27/01* (2013.01); *F16D 27/108* (2013.01); *F16D 28/00* (2013.01); *F16H 1/16* (2013.01); *F16D 11/14* (2013.01); *F16D 2023/123* (2013.01); *F16D 2023/126* (2013.01)

(58) Field of Classification Search
CPC .. B60K 17/3515; B60K 17/354; B60K 23/08; F16D 23/12; F16D 2023/123; F16H 1/16
See application file for complete search history.

(56) References Cited

U.S. PATENT DOCUMENTS

| | | | |
|---|---|---|---|
| 5,740,895 A | 4/1998 | Bigley | |
| 6,082,514 A * | 7/2000 | Averill | F16D 28/00 192/69.42 |
| 6,408,973 B1 | 6/2002 | Beesley et al. | |

(Continued)

*Primary Examiner* — Huan Le
(74) *Attorney, Agent, or Firm* — Dinsmore & Shohl LLP; Yongsok Choi, Esq.

(57) ABSTRACT

The electronic IWE actuator includes an electric motor, a worm gear connected to the electric motor, a ball ramp including a worm wheel configured to engage with the worm gear, a clutch ring configured to engage with a wheel hub of the vehicle, and a shift fork configured to engage with the clutch ring and the ball ramp and move linearly in a direction along an axis of the wheel hub in response to a rotation of the ball ramp. The clutch ring is configured to engage with the wheel hub in response to a rotation of the worm gear in a first direction, and disengage from the wheel hub in response to a rotation of the worm gear in a second direction that is opposite to the first direction.

8 Claims, 14 Drawing Sheets

(51) Int. Cl.
   *F16H 1/16*   (2006.01)
   *F16D 11/14*   (2006.01)

(56) References Cited

U.S. PATENT DOCUMENTS

| | | | |
|---|---|---|---|
| 8,116,956 B2 * | 2/2012 | Connolly | ............... F16D 28/00 |
| | | | 701/67 |
| 9,010,511 B2 | 4/2015 | Eastman | |
| 2003/0094344 A1 | 5/2003 | Pugliese et al. | |
| 2009/0078525 A1 | 3/2009 | Schumacher et al. | |
| 2013/0068583 A1 | 3/2013 | Eastman | |

* cited by examiner

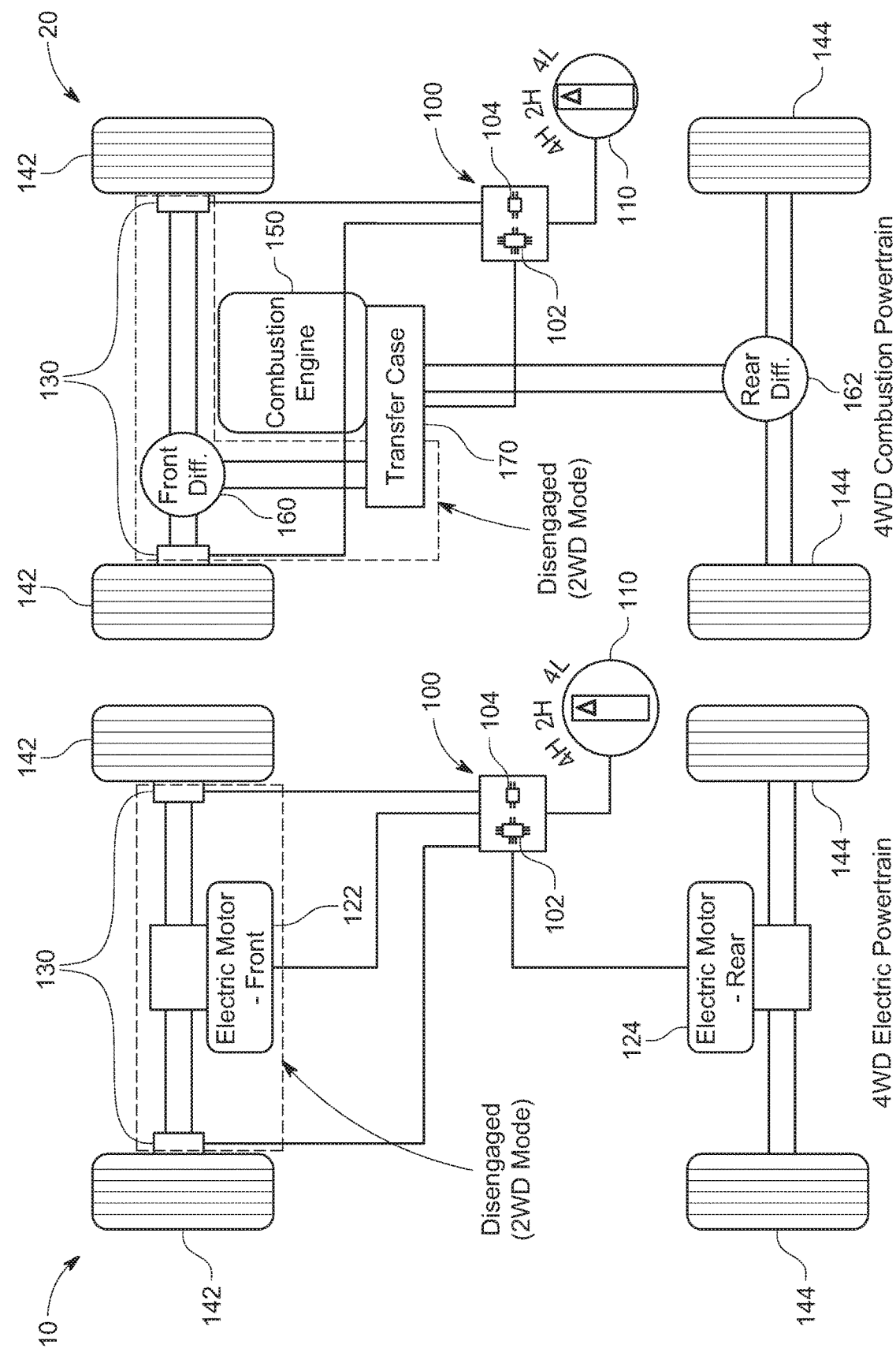
FIG. 1B 4WD Combustion Powertrain
FIG. 1A 4WD Electric Powertrain

Retracted (Reverse Polarity)

Extended (Default Polarity)

ELECTRONIC INTEGRATED WHEEL END DISCONNECT FOR AUTOMOTIVE APPLICATION

CROSS-REFERENCE TO RELATED APPLICATION

This application claims priority to U.S. Provisional Application No. 62/734,498 filed on Sep. 21, 2018, the entire contents of which are incorporated by reference.

TECHNICAL FIELD

The present specification generally relates to integrated wheel end (IWE) actuators, more specifically, electronic IWE actuators that operate without vacuum pumps.

BACKGROUND

A vacuum powered integrated wheel end system includes a vacuum pump that is mechanically connected to a drive shaft on an engine block. The vacuum pump controls vacuum pressure to extend or retract a clutch ring of the IWE system. In two wheel drive (2WD) mode, a control valve is open, and it allows continuous vacuum to be drawn on the actuators via vacuum lines. When the vacuum is drawing on the actuators, the clutch rings of the actuators are disengaged from the wheel hubs. In four wheel drive (4WD) mode, the control valve is closed, and the connections between a vacuum reservoir and the actuators are blocked and the actuators are vented to atmosphere. Return springs in the actuators cause the actuators to engage with the wheel hubs.

The vacuum powered IWE system requires numerous vacuum components that drive up system cost. In addition, the vacuum powered IWE system is prone to leaks that cause undesired engagement of actuators (i.e., switching from 2WD mode to 4WD mode). Furthermore, vacuum components are susceptible to moisture collection that may interfere with vacuum components. Accordingly, a need exists for IWE systems that do not require vacuum components.

SUMMARY

In one embodiment, an electronic integrated wheel end actuator for a vehicle includes an electric motor, a worm gear connected to the electric motor, a ball ramp including a worm wheel configured to engage with the worm gear, a clutch ring configured to engage with a wheel hub of the vehicle, and a shift fork configured to engage with the clutch ring and the ball ramp and move linearly in a direction along an axis of the wheel hub in response to a rotation of the ball ramp.

In another embodiment, an electronic integrated wheel end actuator for a vehicle includes an electronic cable actuator, a cable connected to the electronic cable actuator, an actuator housing, a helical slider connected to the cable and configured to rotate against the actuator housing in response to an extension or retraction of the cable by the electronic cable actuator, a clutch ring configured to engage with a wheel hub of the vehicle; and a shift fork configured to engage with the clutch ring and the helical slider and move linearly in a direction along an axis of the wheel hub in response to a rotation of the helical slider.

In yet another embodiment, an electronic integrated wheel end actuator for a vehicle includes a magnetic field actuator, a clutch ring configured to engage with a wheel hub of the vehicle, and a shift fork configured to engage with the clutch ring and the magnetic field actuator and move in a direction along an axis of the wheel hub in response to an actuation of the magnetic field actuator.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 1A depicts a schematic of an electric vehicle according to one or more embodiments shown and described herein;

FIG. 1B depicts a schematic of a combustion vehicle according to one or more embodiments shown and described herein;

DETAILED DESCRIPTION

Figure 2A:
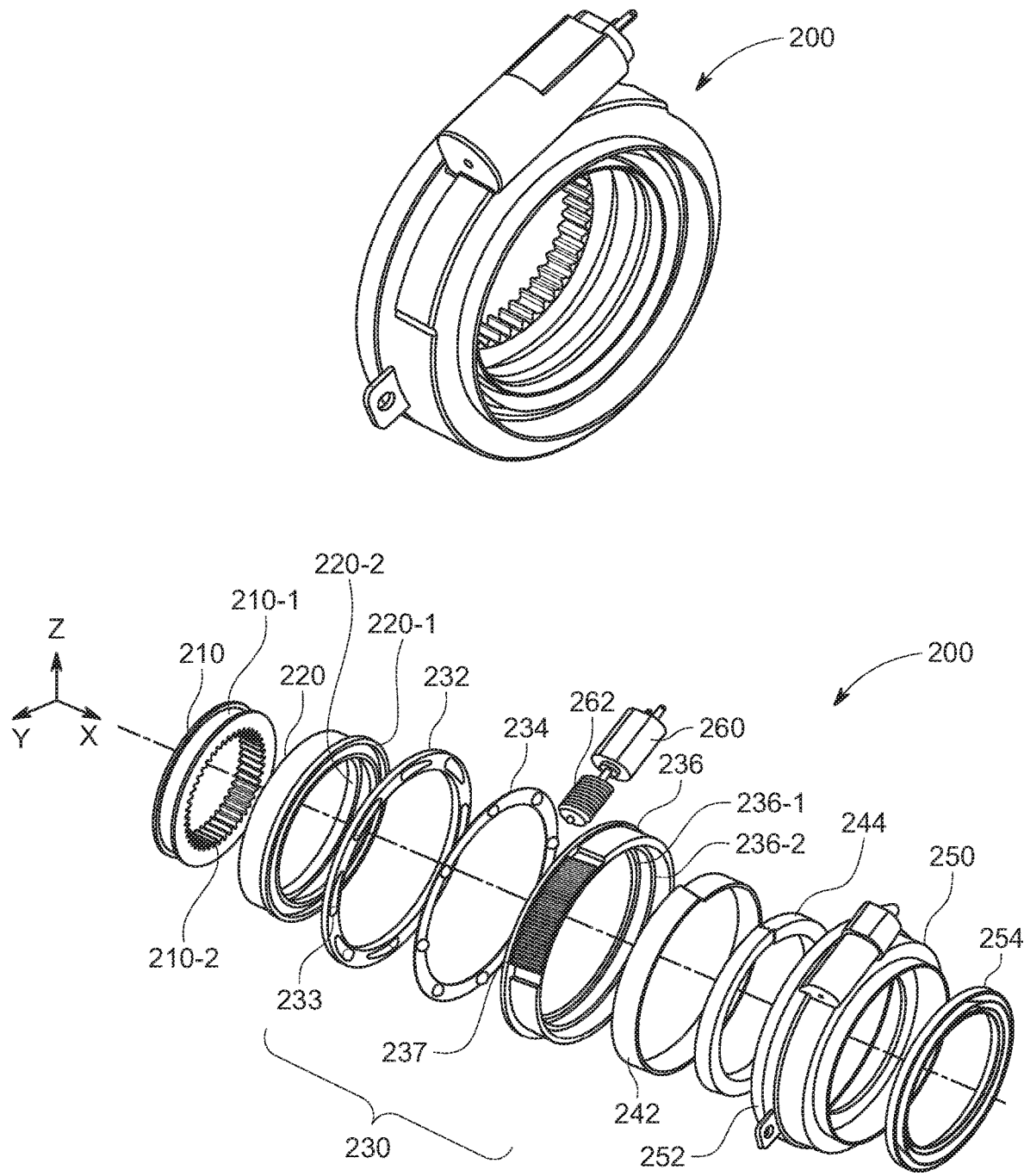
FIG. 2A depicts an electronic IWE actuator and an exploded view thereof, according to one or more embodiments shown and described herein.

The present disclosure describes electronic integrated wheel end (IWE) actuators that replace conventional vacuum powered IWE systems that are currently used on 4WD vehicles. When 4WD vehicles operate in 2WD mode, the electronic IWE actuators would allow the non-driven axles to disconnect from the outboard wheel hub. The non-driven axels no longer have to rotate with the wheel hub. This leads to a reduction in rotational mass and improves fuel efficiency or range.

The embodiments disclosed herein include electronic integrated wheel end actuators. Referring generally to FIG. 2, an electronic IWE actuator for a vehicle is provided. The electronic IWE actuator includes an electric motor, a worm gear connected to the electric motor, a ball ramp including a worm wheel configured to engage with the worm gear, a clutch ring configured to engage with a wheel hub of the vehicle, and a shift fork configured to engage with the clutch ring and the ball ramp and move linearly in a direction along an axis of the wheel hub in response to a rotation of the ball ramp. The clutch ring is configured to engage with the wheel hub in response to a rotation of the worm gear in a first direction, and disengage from the wheel hub in response to a rotation of the worm gear in a second direction that is opposite to the first direction. The ball ramp includes a first annular plate including one or more ramped grooves, a second annular plate including one or more ramped grooves and the warm wheel, and a ball plate including one or more balls configured to be retained in the ramped grooves of the first plate and the second plate.

The electronic IWE actuator according to the present disclosure does not require a vacuum pump, valves, reservoirs, vacuum lines and other vacuum components to operate. Therefore, the present electronic IWE actuator requires fewer components, and thus, is less complex than the conventional vacuum powered IWE system. Since no vacuum pump is required, the electronic IWE actuator may be used in electric vehicle applications where a vacuum pump is typically not available. In addition, the present electronic IWE actuator has greater reliability and lower warranty costs due to the elimination of vacuum lines. The various electronic IWE actuators will be described in more detail herein with specific reference to the corresponding drawings.

FIG. 1A depicts an embodiment of an electric vehicle 10. The electric vehicle 10 includes front wheels 142, rear wheels 144, an electronic control unit 100, a mode switch 110, a front electronic motor 122, a rear electric motor 124, and electronic integrated wheel end actuators 130. The electric vehicle 10 may be an automobile or any other passenger or non-passenger vehicle such as, for example, a terrestrial, aquatic, and/or airborne vehicle. In some embodiments, the electric vehicle 10 is an autonomous vehicle that navigates its environment with limited human input or without human input. In some embodiments, the system may be embedded within a mobile device (e.g., smartphone, laptop computer, etc.) carried by a driver of the electric vehicle 10. The various components of the electric vehicle 10 will now be described.

The mode switch 110 may include three settings: 4H, 4L, and 2H. The setting 2H is a two wheel drive mode that is used in normal road conditions not off-roading. The setting 4H is a four wheel driving mode that is used when the vehicle is in snow or ice, slipper conditions, extremely muddy areas, and the like. The setting 4L is a four wheel driving mode where wheels create substantially more torque than the wheels in 4H mode. The mode switch 110 provides an electronic signal to the electronic control unit 100 in response to the change of the settings.

The electronic control unit 100 includes one or more processors 102 and one or more memory modules 104 communicatively coupled to the one or more processors 102. Each of the one or more processors 102 of the electronic control unit 100 may be any device capable of executing machine readable instructions. Accordingly, each of the one or more processors 102 may be a controller, an integrated circuit, a microchip, a computer, or any other computing device. The one or more processors 102 are communicatively coupled to the other components of the electric vehicle 10 by electric lines. The one or more processors 102 may control the operations of the front electronic motor 122, the rear electric motor 124, and the electronic IWE actuators 130.

Each of the one or more memory modules 104 of the electric vehicle 10 is communicatively coupled to the one or more processors 102. The one or more memory modules 104 may comprise RAM, ROM, flash memories, hard drives, non-transitory storage media, or any device capable of storing machine readable instructions such that the machine readable instructions can be accessed and executed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 104. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The electronic control unit 100 may receive electronic signals from the mode switch 110 and instruct the electronic IWE actuators 130 to lock a wheel hub and a constant velocity (CV) joint together, or unlock them. For example, when the mode switch 110 is in 2H mode, both of the electronic IWE actuators 130 unlock the wheel hubs from the CV joints. In 2H mode, the electronic control unit 100 may power off the front electronic motor 122. When the mode switch 110 changes from the 2H mode to 4H mode or 4H mode, both of the electronic IWE actuators 130 lock the wheel hubs and the CV joints together. Details of various embodiments and operations of the electronic IWE actuators 130 will be described below with reference to FIGS. 2 through 10B.

While FIG. 1A depicts the electronic IWE actuators 130 are disposed with respect to the front wheels 142, the electronic IWE actuators 130 may be disposed with respect the rear wheels 144 such that the transmission power is provided to the front wheels 142 when the electric vehicle 10 is in 2WD mode.

FIG. 1B depicts an embodiment of a combustion vehicle 20. The combustion vehicle 20 includes front wheels 142, rear wheels 144, an electronic control unit 100, a mode switch 110, a combustion engine 150, a front differential 160, a rear differential 162, a transfer case 170, and electronic integrated wheel end actuators 130. The combustion vehicle 20 may be an automobile or any other passenger or non-passenger vehicle such as, for example, a terrestrial, aquatic, and/or airborne vehicle. In some embodiments, the combustion vehicle 20 is an autonomous vehicle that navigates its environment with limited human input or without human input. In some embodiments, the system may be embedded within a mobile device (e.g., smartphone, laptop computer, etc.) carried by a driver of the combustion vehicle 20.

The combustion engine 150 converts thermal energy released by controlled combustion of fuel into mechanical energy, which may be used by the combustion vehicle 20 for a number of purposes, such as to rotate the front wheels 142 and the rear wheels 144 of the combustion vehicle 20. In some embodiments, the fuel combusted by the combustion engine 150 is gasoline or diesel oil. In some embodiments, the fuel combusted by the combustion engine 150 may be another type of fuel, such as propane, natural gas, ethanol, biodiesel, hydrogen, or any other fuel that may be combusted within the combustion engine 150 to produce thermal energy that may be converted into mechanical energy usable by the combustion vehicle 20. The transfer case 170 is a part of the drivetrain of four-wheel-drive, all-wheel-drive, and other multiple powered axle vehicles. The transfer case 170 transfers power from the transmission to the front and rear axles by means of drive shafts. The front differential 160 transfers power from the transfer case 170 to the front wheels 142, and the rear differential 162 transfers power from the transfer case 170 to the rear wheels 144.

As described with respect to FIG. 1A, the electronic control unit 100 in FIG. 1B may receive electronic signals from the mode switch 110 and instruct the electronic IWE actuators 130 to lock a wheel hub and a constant velocity (CV) joint together, or unlock them.

FIG. 2A depicts an assembled electronic IWE actuator 200 and an exploded view of the electronic IWE actuator 200, according to one or more embodiments shown and described herein. The electronic IWE actuator 200 corresponds to the electronic IWE actuators 130 in FIGS. 1A and 1B. The electronic IWE actuator 200 includes a clutch ring 210, a shift fork 220, a ball ramp 230, a ball ramp return spring 242, a shift fork return spring 244, an actuator housing 250, a knuckle seal 252, a CV joint seal 254, an electric motor 260, and a worm gear 262.

Figure 2B:
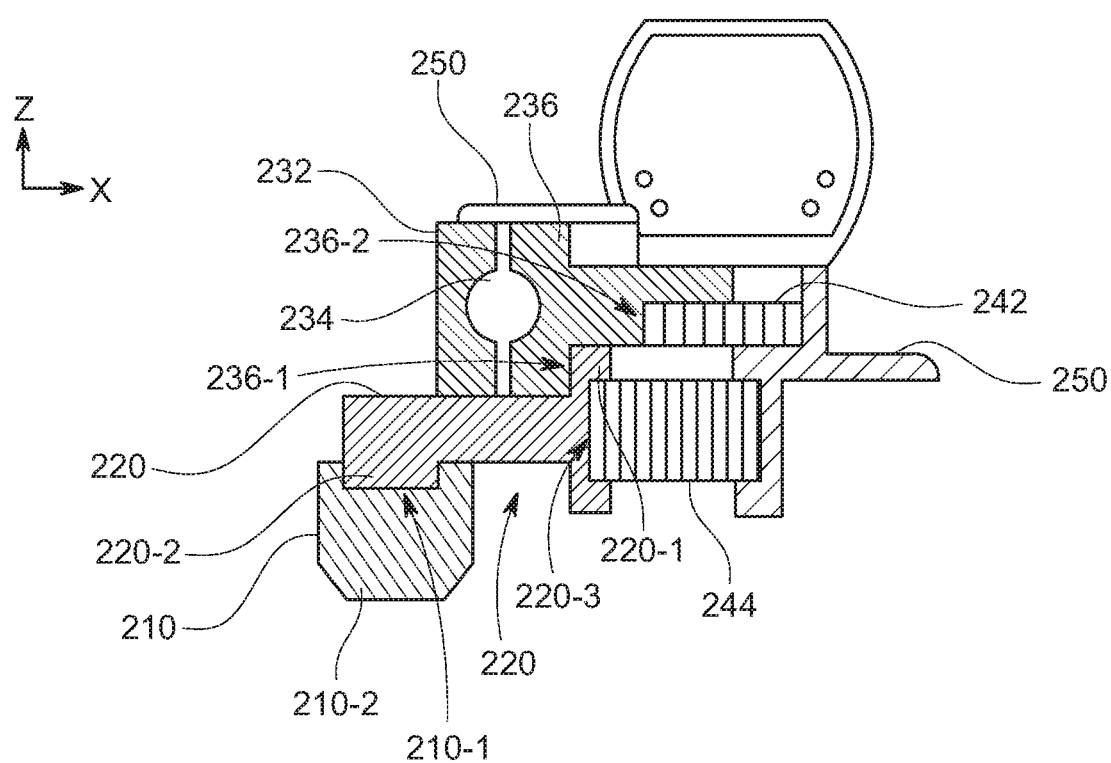
FIG. 2B depicts a cross-section view of an assembled electronic IWE actuator, according to one or more embodiments shown and described herein.

The clutch ring 210 is an annular ring having a bearing groove 210-1 along the rim of the clutch ring 210 as shown in FIG. 2A. The clutch ring 210 includes circular inner teeth 210-2 configured to engage with a wheel hub and/or a CV joint. The shift fork 220 includes an annular base portion 220-1 portion and a circular L-shaped section 220-2. The circular L-shaped section 220-2 of the shift fork 220 is configured to engage with the bearing groove 210-1 of the clutch ring 210 as shown in FIG. 2B. The annular base portion 220-1 includes an annular groove that is configured to receive a portion of the shift fork return spring 244.

The ball ramp 230 includes a first annular plate 232 including one or more ramped grooves 233, a second annular plate 236 including one or more ramped grooves (not shown in FIG. 2) and a worm wheel 237, and a ball plate 234 including one or more balls configured to be retained in the ramped grooves of the first annular plate 232 and the second annular plate 236. The second annular plate 236 includes an annular base portion and a cylindrical sidewall extended from the base portion. The inner surface of the cylindrical sidewall has a first step 236-1 and a second step 236-2. The first step 236-1 of the inner surface of the cylindrical sidewall is configured to engage with the annular base portion 220-1 of the shift fork 220 as shown in FIG. 2B.

The ball ramp 230 converts rotary motion into linear motion via the first annular plate 232 and the second annular plate 236 with the ramped grooves. The first annular plate 232 remains stationary relative to the actuator housing 250 when the electric motor 260 rotates the worm gear 262 while the second annular plate 236 rotates by a predetermined angle. The one or more balls of the ball plate 234 between the first annular plate 232 and the second annular plate 236 roll within the ramped grooves causing the extension or retraction of the ball ramp 230 along the x-axis.

The worm wheel 237 is engaged with the worm gear 262 such that the second annular plate 236 rotates around the x-axis as the worm gear 262 rotates by the electric motor 260. The first annular plate 232 is fixed to the actuator housing 250, and the second annular plate 236 is configured to rotate within the actuator housing 250. As the second annular plate 236 rotates within the actuator housing 250, the second annular plate 236 may move +x or −x direction relative to the first annular plate 232. The details of the movement of the second annular plate 236 relative to the first annular plate 232 will be described below with reference to FIGS. 3, 4A, and 4B.

The ball ramp return spring 242 is a spring having an annular shape. The ball ramp return spring 242 is retained within the actuator housing 250 and configured to exert elastic force against the second annular plate 236 of the ball ramp 230 in −x direction. For example, one end of the ball ramp return spring 242 abuts the second step 236-2 of the inner surface of the cylindrical sidewall of the second annular plate 236 as shown in FIG. 2B. The shift fork return spring 244 is a spring having an annular shape. The shift fork return spring 244 is retained within the actuator housing 250 and configured to exert elastic force against the shift fork 220 in −x direction. For example, one end of the shift fork return spring 244 abuts the annular base portion 220-1 of the shift fork 220.

FIG. 2B depicts a cross-section view of an assembled electronic IWE actuator 200, according to one or more embodiments shown and described herein. The circular L-shaped section 220-2 of the shift fork 220 engages with the bearing groove 210-1 of the clutch ring 210. Once the clutch ring 210 is engaged with the shift fork 220 via the bearing groove 210-1, the clutch ring 210 is configured to rotate around the x-axis guided by the L-shaped section 220-2 of the shift fork 220. The clutch ring 210 may rotate around the x-axis independent of the shift fork 220. That is, the shift fork 220 is fixed at a position while the clutch ring 210 rotates about the x-axis.

The ball ramp 230 engages with the shift fork 220 within the housing 250. By referring to FIG. 2B, the first annular plate 232 of the ball ramp 230 is fixed in a position relative to the housing 250. The second annular plate 236 of the ball ramp 230 abuts the shift fork 220. Specifically, as shown in FIG. 2B, the first step 236-1 of the second annular plate 236 engages with the annular base portion 220-1 of the shift fork 220. Thus, when the second annular plate 236 moves in +x direction (e.g., due to the rotation of the worm gear 262), the shift fork 220 moves in +x direction along with the second annular plate 236. Similarly, when the second annular plate 236 moves in −x direction, the shift fork 220 moves in −x direction along with the second annular plate due to elastic force exerted by the shift fork return spring 244.

By still referring to FIG. 2B, the shift fork return spring 244 is installed between the annular groove 220-3 of the shift fork 220 and the wall of the housing 250. The annular groove 220-3 of the shift fork 220 receives one end of the shift fork return spring 244. The other end of the shift fork return spring 244 abuts the housing 250. The shift fork return spring 244 exerts elastic force against the shift fork 220 in −x direction such that the shift fork 220 is in a default position (i.e., an extended position) when the ball ramp 230 is retracted.

By still referring to FIG. 2B, the ball ramp return spring 242 is installed between the second step 236-2 of the second annular plate 236 and the wall of the housing 250. For example, one end of the ball ramp return spring 242 abuts the second step 236-2 of the second annular plate 236. The ball ramp return spring 242 exerts elastic force against the second annular plate 236 in −x direction such that the ball ramp 230 is in a retracted condition.

Figure 3:
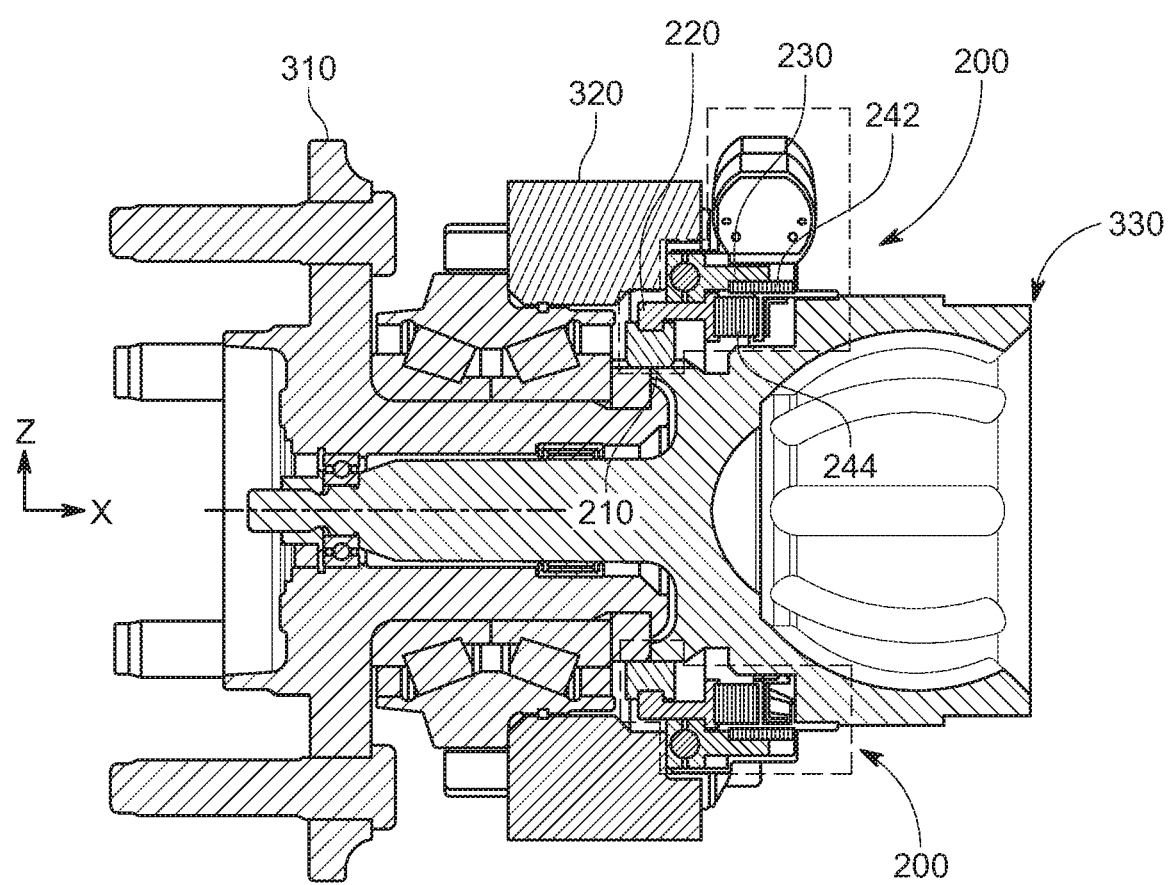
FIG. 3 depicts a cross-section view of the electronic IWE actuator installed in a vehicle, according to one or more embodiments shown and described herein.

FIG. 3 depicts a cross-section view of the electronic IWE actuator 200 installed in a vehicle, according to one or more embodiments shown and described herein. As shown in FIG. 3, the electronic IWE actuator 200 surrounds a portion of a CV joint 330 and a portion of the wheel hub 310. The CV joint 330 is rotatably supported in the wheel hub 310 which is rotatably supported in a knuckle 320. The clutch ring 210 of the electronic IWE actuator 200 may be slidable between a position of interlocked engagement with one of the wheel hub 310 and the CV joint 330 and a position of interlocked engagement with both of the wheel hub 310 and the CV joint 330. FIG. 3 depicts that the clutch ring 210 is in a position of interlocked engagement with both of the wheel hub 310 and the CV joint 330

As depicted in FIG. 3, the circular L-shaped section of the shift fork 220 is engaged with the bearing groove of the clutch ring 210. The annular base portion of the shift fork 220 abuts the first step 236-1 of the second annular plate 236 of the ball ramp 230 such that the shift fork 220 and the second annular plate 236 move integrally in +x or −x direction. The shift fork return spring 244 is disposed between the annular base portion 220-1 of the shift fork 220 and the actuator housing 250. The shift fork return spring 244, when contracted, is configured to exert elastic force against the shift fork 220 in −x direction. The ball ramp return spring 242 is disposed between the second step 236-2 of the second annular plate 236 and the actuator housing 250. The ball ramp return spring 242, when contracted, is configured to exert elastic force against the second annular plate 236 of the ball ramp 230 in −x direction.

The second annular plate 236 moves relative to the actuator housing 250 in +x or −x direction in response to a rotation of the second annular plate 236 around an axis of the wheel hub 310 that is in line with the x axis in FIG. 3. When the second annular plate 236 moves in +x direction, the shift fork 220 and the clutch ring 210 move integrally with the second annular plate 236 in +x direction, and thus, the clutch ring 210 disengages from the wheel hub 310 and engages with the CV joint 330 only.

Figure 4A:
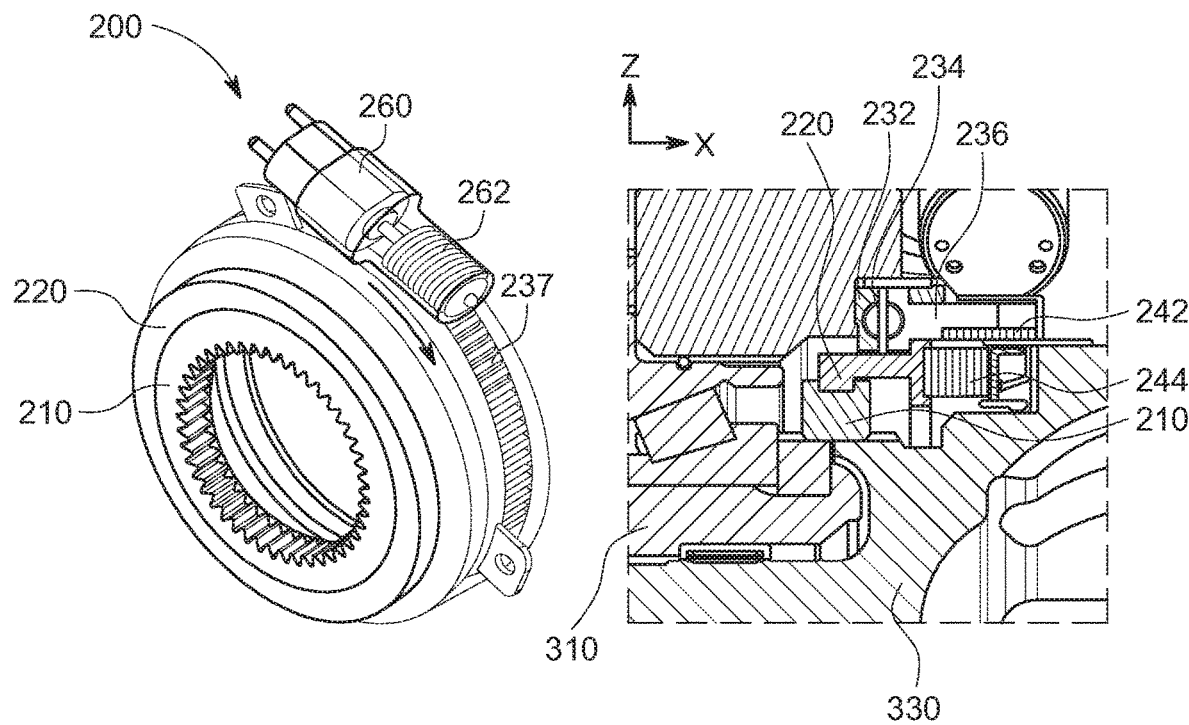
FIG. 4A depicts engagement of a clutch ring with a wheel hub in response to an operation of an electric motor of the electronic IWE actuator, according to one or more embodiments shown and described herein.

FIG. 4A depicts engagement of the clutch ring 210 with the wheel hub 310 in response to an operation of the electric motor 260, according to one or more embodiments shown and described herein. The electric motor 260 may be controlled by the electronic control unit of the vehicle, for example, the electronic control unit 100 in FIG. 1A or 1B. As shown in FIG. 4A, the electric motor 260 rotates the worm gear 262 in one direction, which in turn rotates the second annular plate 236 clockwise (i.e., in the direction indicated by the arrow in FIG. 4A). As the second annular plate 236 rotates clockwise, the second annular plate 236 moves toward the first annular plate 232 (i.e., −x direction in FIGS. 3 and 4A) until the ball ramp 230 is fully retracted, i.e., until the one or more balls of the ball plate 234 are completely fit within the grooves of the first annular plate 232 and the second annular plate 236 as shown in FIG. 4A. The ball ramp return spring 242 exerts elastic force pushing the second annular plate 236 in −x direction to help the retraction of the ball ramp 230.

The shift fork 220 and the clutch ring 210 also moves in −x direction along with the second annular plate 236. Specifically, the shift fork 220 moves in −x direction due to elastic force exerted by the shift fork return spring 244 as the second annular plate 236 moves in −x direction. The clutch ring 210 moves in −x direction along with the shift fork 220 because the clutch ring 210 engages with the shift fork 220 via the circular L-shaped section 220-2. Thus, the clutch ring 210 moves along with the movement of the second annular plate 236 (i.e., −x direction in FIGS. 3 and 4A) to be in a position of interlocked engagement with both of the wheel hub 310 and the CV joint 330. That is, the clutch ring 210 locks the wheel hub 310 and the CV joint 330 to rotate integrally. The clutch ring 210 rotates freely on the shift fork 220 such that the clutch ring 210 can rotate with the wheel hub 310 while the rest of the electronic IWE actuator 200 remains stationary.

Figure 4B:
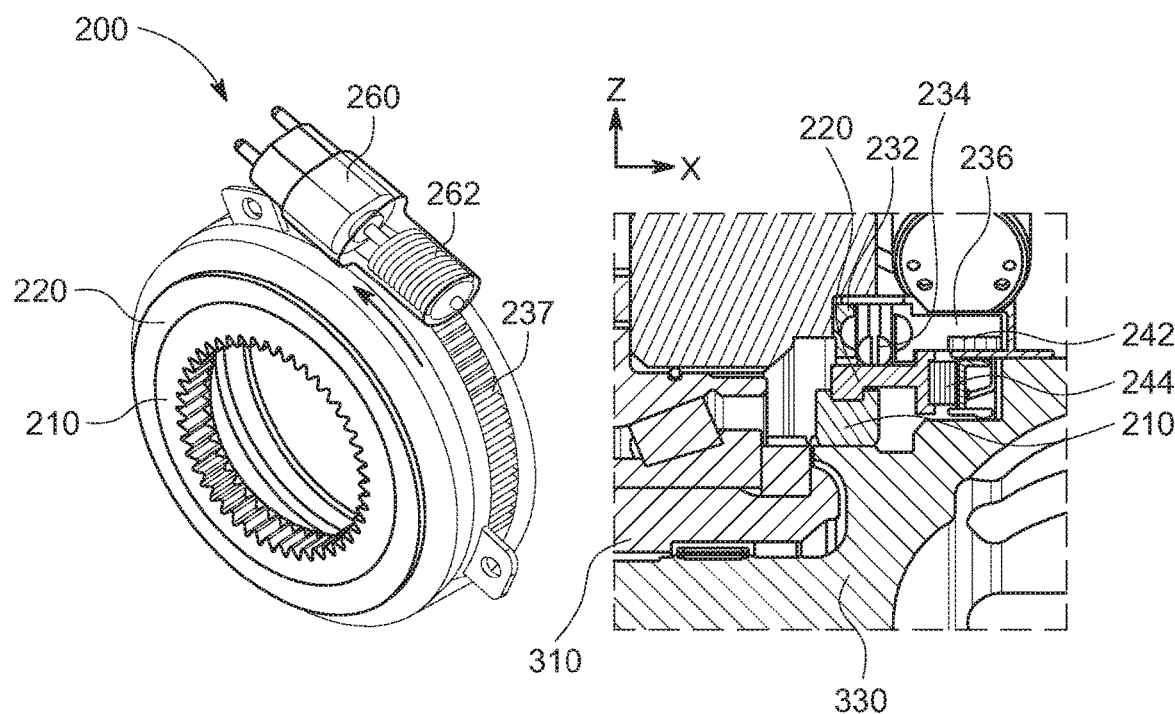
FIG. 4B depicts disengagement of the clutch ring from the wheel hub in response to an operation of the electric motor of the electronic IWE actuator, according to one or more embodiments shown and described herein.

FIG. 4B depicts disengagement of the clutch ring 210 from the wheel hub 310 in response to an operation of the electric motor 260, according to one or more embodiments shown and described herein. As shown in FIG. 4B, the electric motor 260 rotates the worm gear 262 in another direction opposite to the direction in FIG. 4A, which in turn rotates the second annular plate 236 counterclockwise (i.e., in the direction indicated by the arrow in FIG. 4B). As the second annular plate 236 rotates counterclockwise, the second annular plate 236 moves away from the first annular plate 232 (i.e., +x direction in FIGS. 3 and 4B) until the ball ramp 230 is fully extended, for example, until the one or more balls of the ball plate 234 are completely out of the grooves of the first annular plate 232 and the second annular plate 236 as shown in FIG. 4B.

The shift fork 220 and the clutch ring 210 also moves in +x direction along with the second annular plate 236. Specifically, the shift fork 220 moves in +x direction because of the engagement between the first step 236-1 of the second annular plate 236 and the annular base portion 220-1 of the shift fork 220. The clutch ring 210 moves in +x direction along with the shift fork 220 because the clutch ring 210 engages with the shift fork 220 via the circular L-shaped section 220-2. Thus, the clutch ring 210 moves along with the movement of the second annular plate 236 in +x direction to be in a position of interlocked engagement with the CV joint 330 only. Because the clutch ring 210 does not engage with the wheel hub 310, the wheel hub 310 and the CV joint 330 rotate independently.

The low angle of the ball ramp 230 combined with the gear ratio of the worm gear 262 causes the electronic IWE actuator 200 to generate a high actuation force with a relatively small low-torque motor, e.g., the electric motor 260. The worm wheel 237 of the second annular plate 236 does not back drive the worm gear 262 such that the electronic IWE actuator 200 may be locked in the engage position or the disengaged position with very little continuous power drawn from the electric motor 260. In contrast, a relatively high power drawn from the electric motor 260 is needed when the electronic IWE actuator 200 switches between the engaged and disengaged positions.

Figure 5A:
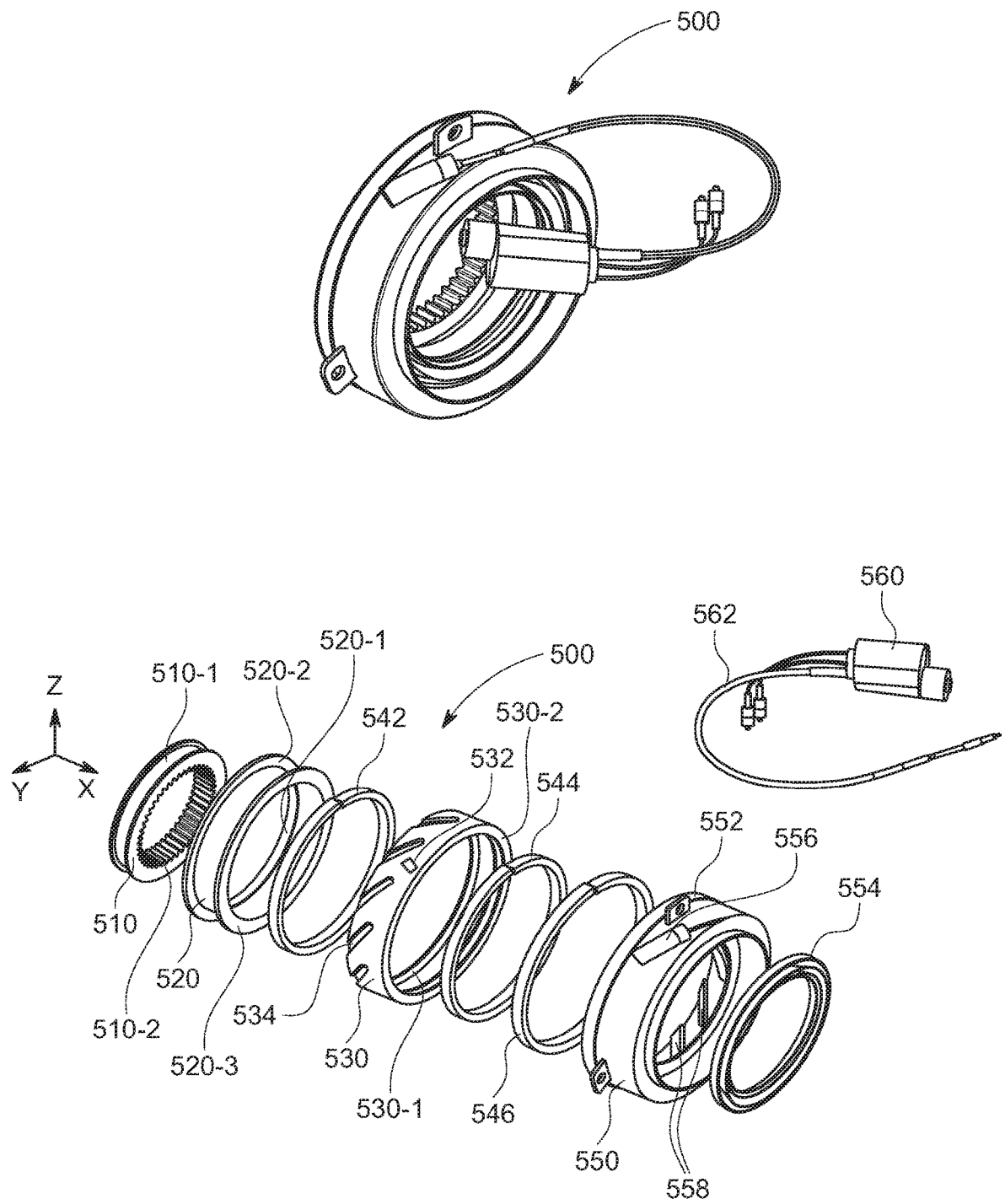
FIG. 5A depicts an electronic IWE actuator and an exploded view thereof, according to another embodiment shown and described herein.

FIG. 5A depicts an electronic IWE actuator 500 and an exploded view of the electronic IWE actuator 500, according to another embodiment shown and described herein. The electronic IWE actuator 500 corresponds to the electronic IWE actuators 130 in FIGS. 1A and 1B. The electronic IWE actuator 500 includes a clutch ring 510, a shift fork 520, a helical slider 530, a first shift fork return spring 542, a second shift fork return spring 544, a helical slider return spring 546, an actuator housing 550, a knuckle seal 552, a CV joint seal 554, an electronic cable actuator 560, and a cable 562.

The clutch ring 510 is an annular ring having a bearing groove 510-1 along the rim of the clutch ring 510 as shown in FIG. 5. The clutch ring 510 includes circular inner teeth 510-2 configured to engage with a wheel hub and/or a CV joint. The shift fork 520 includes a circular L-shaped section 520-1, a first rim 520-2, and a second rim 520-3. The circular L-shaped section 520-1 of the shift fork 520 is engaged with the bearing groove 510-1 of the clutch ring 510.

The helical slider 530 includes one or more helical grooves 534 on the outer surface of the helical slider 530 and a cable attachment 532 configured to connect with the cable 562 as shown in FIG. 5A. The helical slider 530 also includes a first rim 530-1 and a second rim 530-2 protruding toward the center of the helical slider 530 as shown in FIG. 5A. The helical slider 530 is configured to be retained in the actuator housing 550 when assembled. The actuator housing 550 includes one or more helical tracks 558 that correspond to the one or more helical grooves 534 of the helical slider 530. The one or more helical grooves 534 of the helical slider 530 are configured to engage with the helical tracks 558 of the actuator housing 550. The actuator housing 550 includes a channel 556 for the cable attachment 532 to slide within the channel 556.

Figure 5B:
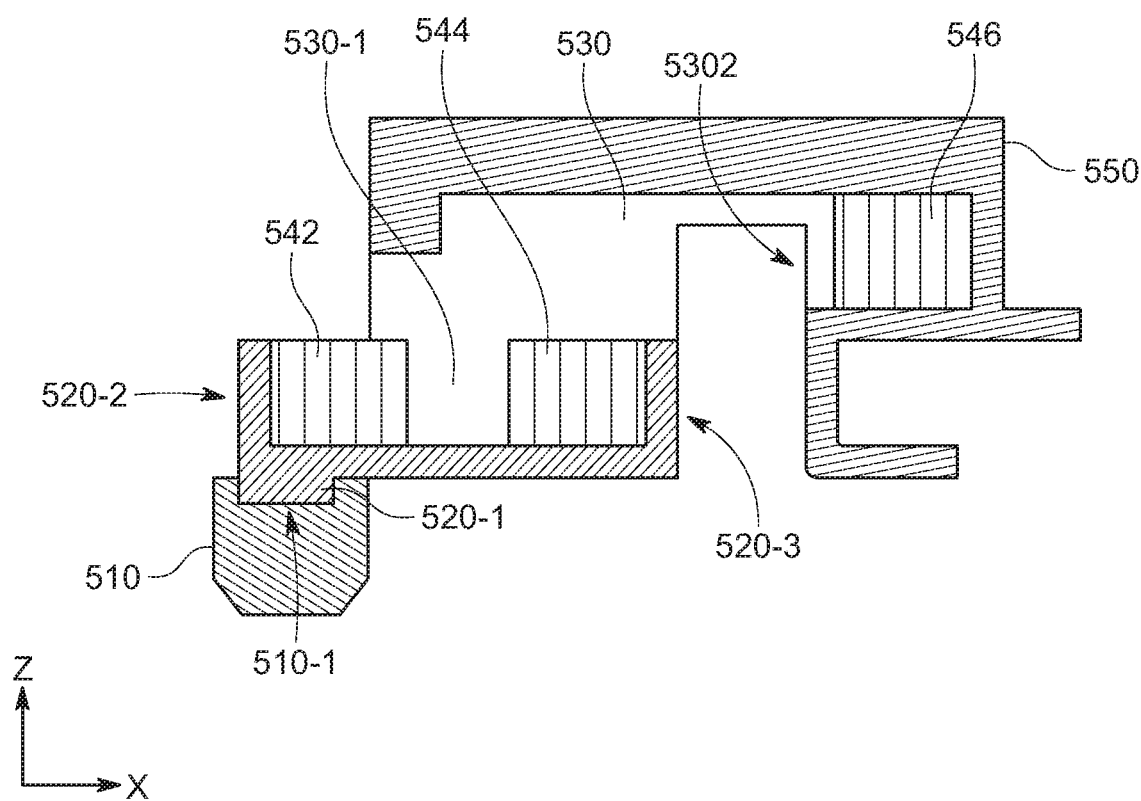
FIG. 5B depicts a cross-section view of an assembled electronic IWE actuator, according to another embodiment shown and described herein.

The first shift fork return spring 542 is a spring having an annular shape. The first shift fork return spring 542 is positioned between the first rim 520-2 of the shift fork 520 and the first rim 530-1 of the helical slider 530 as shown in FIG. 5B. Similarly, the second shift fork return spring 544 is positioned between the second rim 520-3 of the shift fork 520 and the first rim 530-1 of the helical slider 530 as shown in FIG. 5B.

The helical slider return spring 546 is disposed between the second rim 530-2 of the helical slider 530 and the actuator housing 550 as shown in FIG. 5B. The helical slider return spring 546 is configured to exert elastic force against the helical slider 530 in −x direction. For example, one end of the helical slider return spring 546 abuts the second rim 530-2 of the helical slider 530.

The electronic cable actuator 560 may operate to extend or retract the cable 562 one end of which is attached to the electronic cable actuator 560. The electronic cable actuator 560 may be controlled by the electronic control unit of the vehicle, for example, the electronic control unit 100 in FIG. 1A or 1B. The other end of the cable 562 is attached to the cable attachment 532 of the helical slider 530. The electronic cable actuator 560 may use a solenoid or an electric motor depending on speed and force requirements for the application. When the cable 562 is retracted by the electronic cable actuator 560, the cable 562 causes the helical slider 530 to rotate. Because the one or more helical grooves 534 of the helical slider 530 engage with the one or more helical tracks 558 of the actuator housing 550, the helical slider 530 moves linearly in +x or −x direction as it rotates. The direction of the linear movement may depend on the orientation of the one or more helical grooves 534. For example, in FIG. 5, the helical slider 530 moves in +x direction when the cable 562 is retracted by the electronic cable actuator 560.

When the cable 562 is extended by the electronic cable actuator 560, the helical slider return spring 564 causes the helical slider 530 to rotate. Because the one or more helical grooves 534 of the helical slider 530 engage with the one or more helical tracks 558 of the actuator housing 550, the helical slider 530 moves in +x or −x direction as it rotates. The direction of the linear movement may depend on the orientation of the one or more helical grooves 534. For example, in FIG. 5, the helical slider 530 moves in −x direction when the cable 562 is extended by the electronic cable actuator 560.

FIG. 5B depicts a cross-section view of an assembled electronic IWE actuator 500, according to another embodiment shown and described herein. The circular L-shaped section 520-1 of the shift fork 520 engages with the bearing groove 510-1 of the clutch ring 510. Once the clutch ring 510 is engaged with the shift fork 520 via the bearing groove 510-1, the clutch ring 510 is configured to rotate around the x-axis guided by the L-shaped section 520-1 of the shift fork 520. The clutch ring 510 may rotate around the x-axis independent of the shift fork 520. That is, the shift fork 520 is fixed at a position while the clutch ring 510 rotates about the x-axis.

The helical slider 530 is retained in the actuator housing 550. Specifically, the helical slider 530 is secured by the actuator housing 550 and the helical slider return spring 546 when assembled. The helical slider 530 is configured to move linearly in +x or −x direction as within the actuator housing 550 as the helical slider 530 rotates due to the retraction or extension of the cable 562. The second rim 530-2 of the helical slider 530 engages with one end of the helical slider return spring 546. The first rim 530-1 of the helical slider 530 engages with the shift fork 520 via the first shift fork return spring 542 and the second shift fork return spring 544. Specifically, when the helical slider 530 moves in +x direction both the first shift fork return spring 542 and the second shift fork return spring 544 exert elastic force to the shift fork 520 in +x direction such that the shift fork 520 moves along with the helical slider 530.

Figure 6:
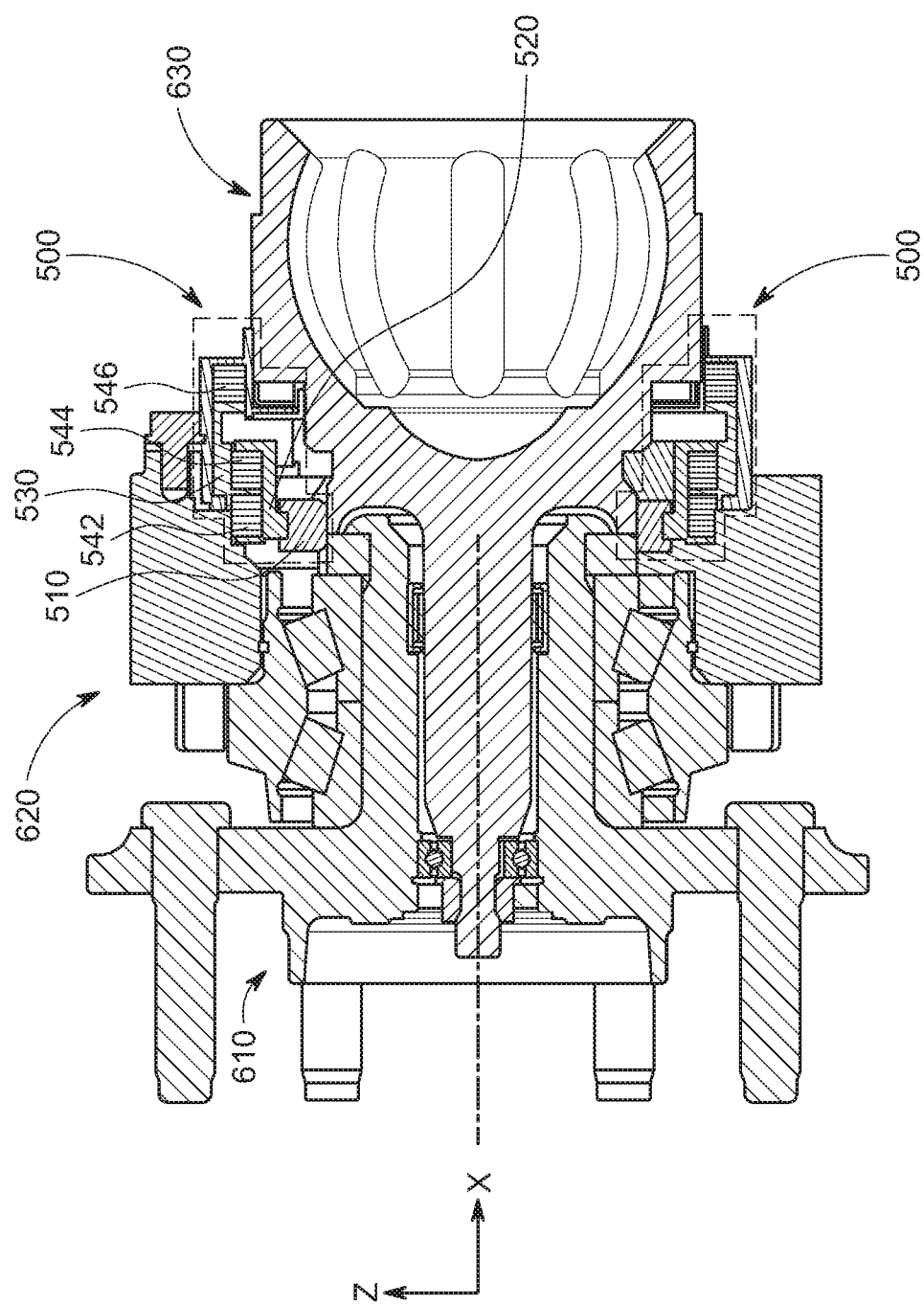
FIG. 6 depicts a cross-section view of the electronic IWE actuator installed in a vehicle, according to another embodiment shown and described herein.

FIG. 6 depicts a cross-section view of the electronic IWE actuator 500 installed in a vehicle, according to another embodiment shown and described herein. As shown in FIG. 6, the electronic IWE actuator 500 surrounds a portion of a CV joint 630 and a portion of the wheel hub 610. The CV joint 630 is rotatably supported in the wheel hub 610 which is rotatably supported in a knuckle 620. The clutch ring 510 of the electronic IWE actuator 500 may be slidable between a position of interlocked engagement with one of the wheel hub 610 and the CV joint 630 and a position of interlocked engagement with both of the wheel hub 610 and the CV joint 630. FIG. 6 depicts that the clutch ring 510 is in a position of interlocked engagement with both of the wheel hub 610 and the CV joint 630

By referring to FIGS. 5B and 6, the circular L-shaped section 520-1 of the shift fork 520 is engaged with the clutch ring 510. The first shift fork return spring 542 is disposed between the first rim 520-2 of the shift fork 520 and the first rim 530-1 of the helical slider 530. Similarly, the second shift fork return spring 544 is positioned between the second rim 520-3 of the shift fork 520 and the first rim 530-1 of the helical slider 530. When the helical slider 530 moves in +x or -x direction, the first shift fork return spring 542 and the second shift fork return spring 544 in combined push the shift fork 520 in the same direction as the helical slider 530 moves. That is, when the helical slider 530 moves +x direction due to the rotation of the helical slider 530 in one direction, the shift fork 520 also moves in +x direction. When the helical slider 530 moves -x direction due to the rotation of the helical slider 530 in opposite direction, the shift fork 520 also moves in -x direction.

As described above, the first shift fork return spring 542 and the second shift fork return spring 544 placed between the shift fork 520 and the helical slider 530 allow the helical slider 530 to move in +x or -x direction with respect to the actuator housing 550 even when the clutch ring 510 and the shift fork 520 are blocked from moving in +x or -x direction, for example, due to the wheel hub speed and CV joint speed being out of sync or due to excessive torque being transmitted between the wheel hub 610 and CV joint 630 through the clutch ring 510. In either of these cases, the first shift fork return spring 542 and the second shift fork return spring 544 may apply a force to the combination of the shift fork 520 and the clutch ring 510, thereby shifting the clutch ring 510 into a desired position when the excessive torque is reduced or when the wheel hub and the CV joint are synchronized.

The helical slider return spring 546 is disposed between the helical slider 530 and the actuator housing 550 and exerts elastic force against the helical slider 530 in -x direction. Thus, when the electronic cable actuator 560 does not operate properly and the cable 562 loses tension, the helical slider return spring 546 may push the helical slider 530 in -x direction such that the clutch ring 510 is engaged with the wheel hub 610.

Figure 7A:
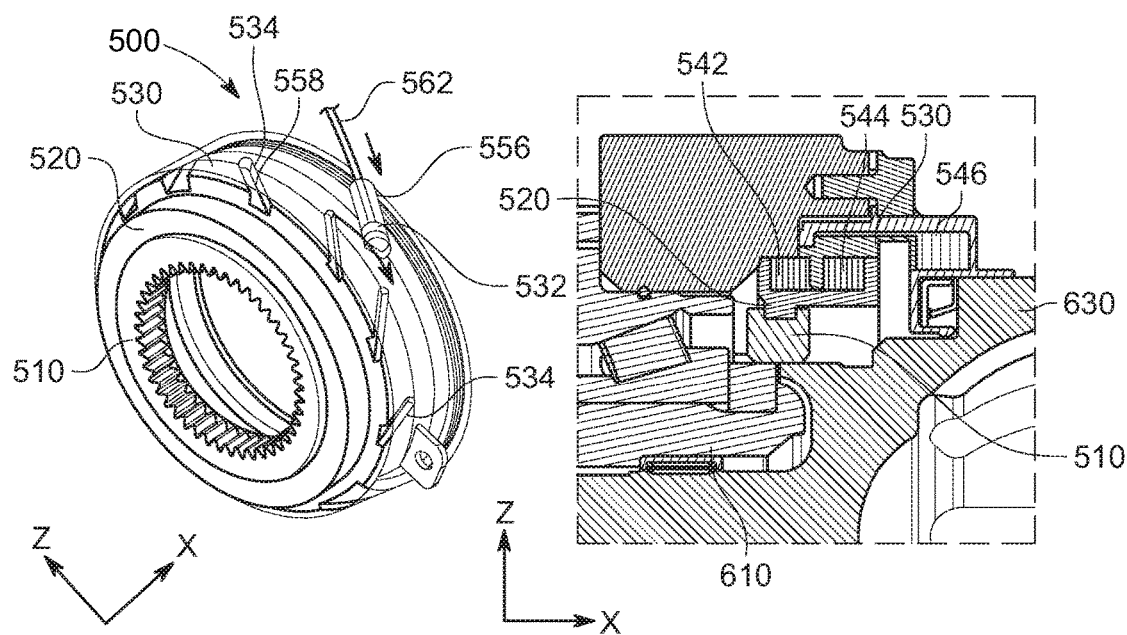
FIG. 7A depicts engagement of a clutch ring with a wheel hub in response to an operation of the electronic cable actuator of the electronic IWE actuator, according to one or more embodiments shown and described herein.
Figure 7B:
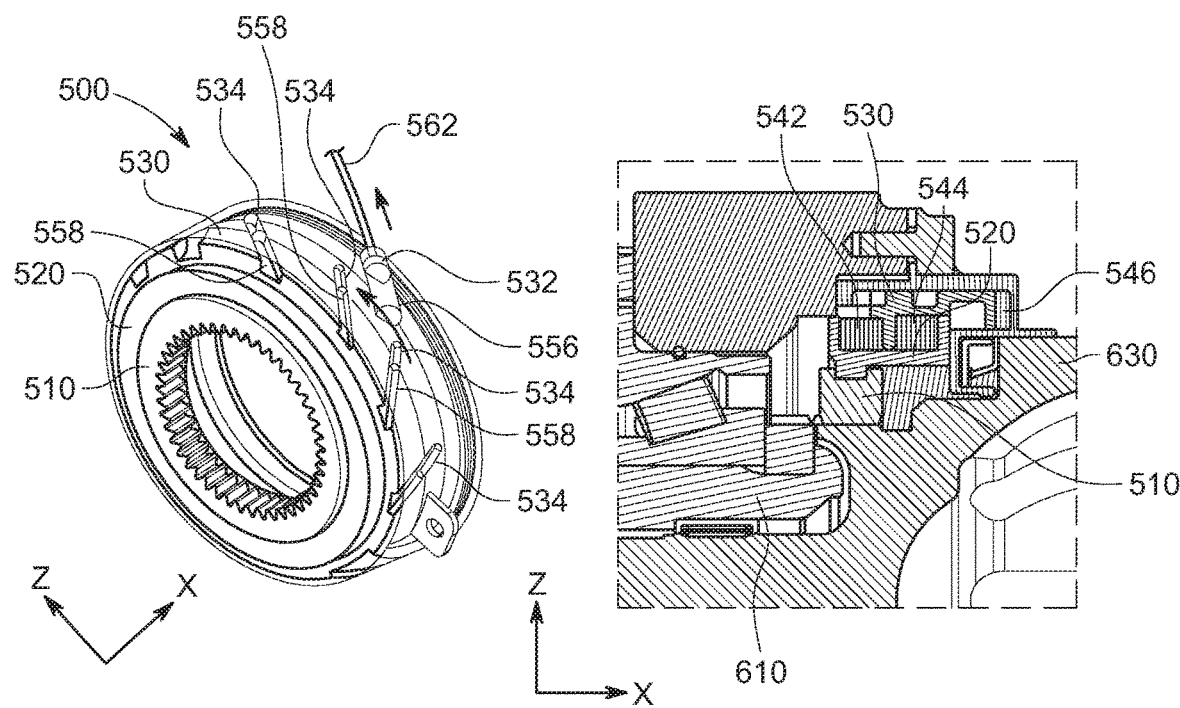
FIG. 7B depicts disengagement of the clutch ring from the wheel hub in response to an operation of the electronic cable actuator of the electronic IWE actuator, according to one or more embodiments shown and described herein.

FIG. 7A depicts engagement of the clutch ring 510 with the wheel hub 610 in response to an operation of the electronic cable actuator 560, according to one or more embodiments shown and described herein. Initially, the cable may be retracted by the electronic cable actuator 560 to rotate the helical slider 530 as shown in FIG. 7B. When the cable 562 is extended by the electronic cable actuator 560, the helical slider return spring 546 pushes the helical slider 530 in -x direction as shown in FIG. 7A. In response, the helical slider 530 rotates clockwise (i.e., in the direction indicated by the arrow in FIG. 7A) guided by the one more helical tracks 558 of the actuator housing 550 until the one or more helical grooves 534 are stopped by the one or more helical tracks 558. While the helical slider 530 rotates clockwise, the helical slider 530 also moves linearly in -x direction to an extended position as shown in FIG. 7A. The shift fork 520 and the clutch ring 510 move in -x direction as the helical slider 530 moves in -x direction because the helical slider 530 is engaged with the shift fork 520 via the first shift fork return spring 542 and the second shift fork return spring 544, and the first shift fork return spring 542 and the second shift fork return spring 544 exert elastic force against the shift fork 520 in -x direction. Then, the clutch ring 510 engages with the wheel hub 610 and the CV joint 630 such that the wheel hub 610 and the CV joint 630 rotate integrally.

The first shift fork return spring 542 and the second shift fork return spring 544 placed between the shift fork 520 and the helical slider 530 may allow the helical slider 530 to move in -x direction with respect to the actuator housing 550 when the clutch ring 510 and the shift fork 520 are blocked from moving in -x direction. For example, the clutch ring 510 and the shift fork 520 are blocked from moving in -x direction due to the wheel hub speed and CV joint speed being out of sync. In this case, the first shift fork return spring 542 and the second shift fork return spring 544 may apply elastic force to the combination of the shift fork 520 and the clutch ring 510, thereby shifting the clutch ring 510 into an extended position when the wheel hub 610 and the CV joint 630 are synchronized.

FIG. 7B depicts disengagement of the clutch ring 510 from the wheel hub 610 in response to an operation of the electronic cable actuator 560, according to one or more embodiments shown and described herein. When the cable 562 is retracted by the electronic cable actuator 560, the helical slider 530 rotates in a direction indicated by the arrow shown in FIG. 7B guided by the one more helical tracks 558 of the actuator housing 550. Because the one or more helical grooves 534 of the helical slider 530 engage with the one or more helical tracks 558 of the actuator housing 550, the helical slider 530 linearly moves in +x direction as it rotates. The shift fork 520 and the clutch ring 510 move in +x direction as the helical slider 530 moves in +x direction because the helical slider 530 is engaged with the shift fork 520 via the first shift fork return spring 542 and the second shift fork return spring 544, and the first shift fork return spring 542 and the second shift fork return spring 544 exert elastic force against the shift fork 520 in +x direction. Then, the clutch ring 510 is disengaged from the wheel hub 610 as shown in FIG. 7B such that the wheel hub 610 and the CV joint 630 rotate independently.

The first shift fork return spring 542 and the second shift fork return spring 544 placed between the shift fork 520 and the helical slider 530 may allow the helical slider 530 to move in +x direction with respect to the actuator housing 550 when the clutch ring 510 and the shift fork 520 are blocked from moving in +x direction. For example, the clutch ring 510 and the shift fork 520 are blocked from moving in +x direction due to the wheel hub speed and CV joint speed being out of sync. As another example, the clutch ring 510 and the shift fork 520 are blocked from moving in +x direction due to excessive torque being transmitted between the wheel hub 610 and CV joint 630 through the clutch ring 510. In either of these cases, the first shift fork return spring 542 and the second shift fork return spring 544 may apply elastic force to the combination of the shift fork 520 and the clutch ring 510, thereby shifting the clutch ring 510 into a retracted position when the excessive torque is reduced or the wheel hub 610 and the CV joint 630 are synchronized.

In this embodiment, using the electronic cable actuator allows the electronic actuator to be mounted remotely and inboard on the vehicle. This reduces the outboard packaging space requirements of the actuator housing. With more space inboard on the vehicle, a larger, faster and more powerful electronic actuator may be used. Mounting the electronic actuator inboard on the vehicle also reduces unsprung mass on the outboard corner assembly and isolates the electronic actuator from road noise and vibration which may negatively affect the service life of the electronic actuator.

Figure 8A:
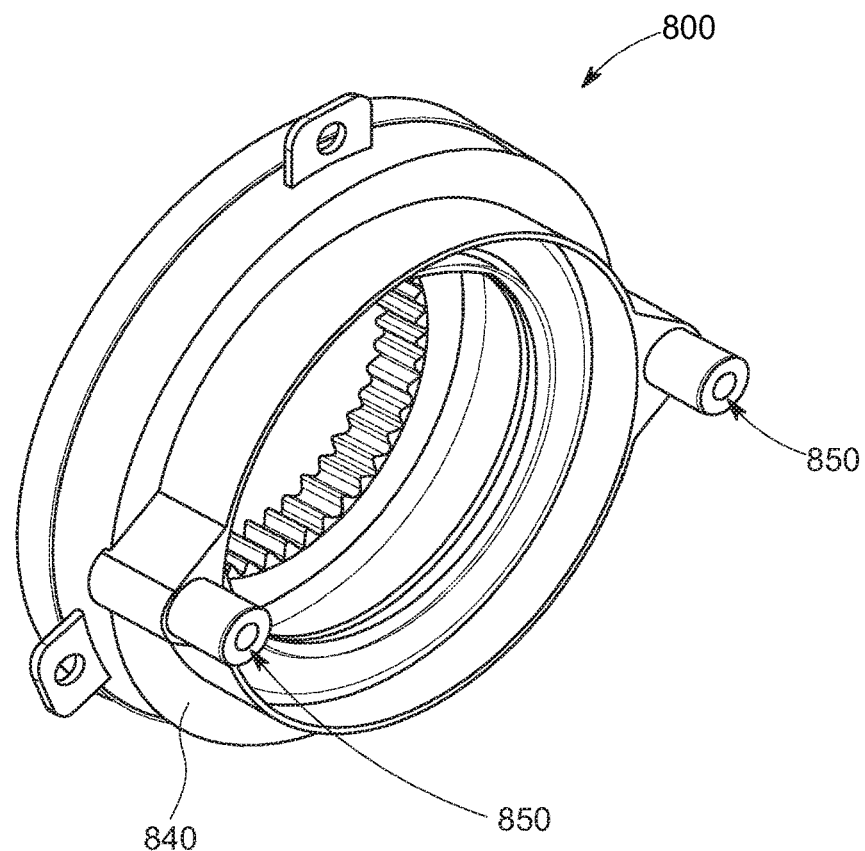
FIG. 8A depicts an electronic IWE actuator having solenoids, according to another embodiment shown and described herein.

FIG. 8A depicts an electronic IWE actuator 800 having solenoids, according to another embodiment shown and described herein. The electronic IWE actuator 800 corresponds to the electronic IWE actuators 130 in FIGS. 1A and 1B. The solenoids 850 are mounted on the actuator housing 840 of the electronic IWE actuator 800 as shown in FIG. 8. Two solenoids 850 are disposed on the opposite side of the actuator housing 840. Each of the solenoids 850 may be linear solenoids that convert electrical energy into a mechanical pushing or pulling force or motion. In embodiments, the solenoids 850 may push or pull the shift fork of the electronic IWE actuator 800, which will be described below with reference to FIG. 9. While FIG. 8 depicts the electronic IWE actuator 800 with two solenoids 850, the electronic IWE actuator 800 may include more than or less than two solenoids 850.

Figure 8B:
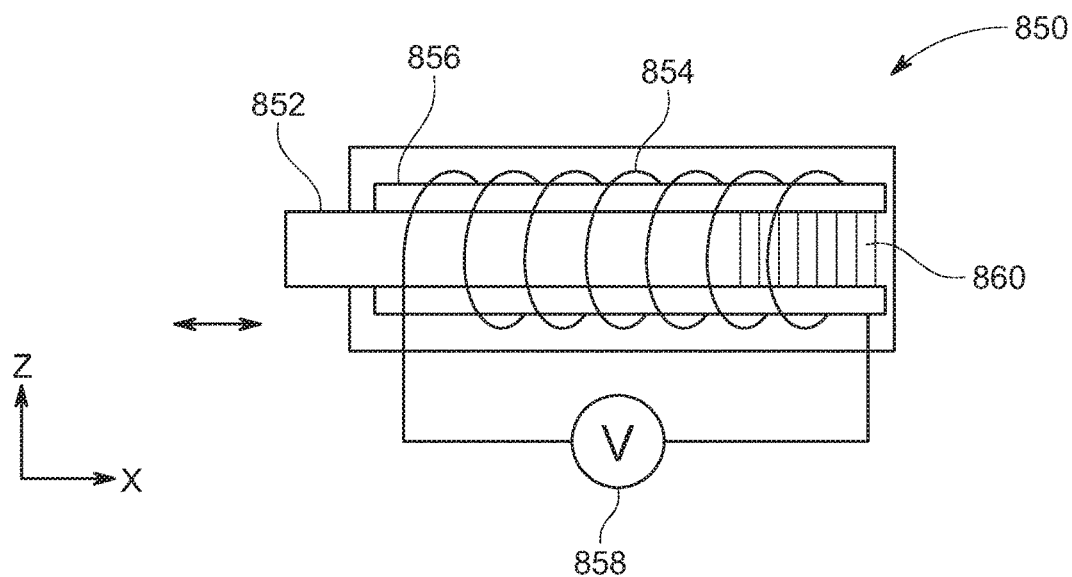
FIG. 8B depicts a schematic internal view of the solenoid, according to another embodiment shown and described herein.

FIG. 8B depicts a schematic internal view of the solenoid 850, according to one or more embodiments shown and described herein. The solenoid 850 includes a bar 852, a wire 854, a rail 856, and a power supplier 858. In some embodiment, the solenoid 850 may not include the rail 856. The bar 852 is wrapped around by the wire 854. The power supplier 858 supplies current to generate electromagnetic field that causes the bar 852 to either move in +x direction or −x direction. In some embodiments, the solenoid 850 includes a spring 860 that exerts elastic force against the bar 852 in −x direction. Thus, when in a default mode, the bar 852 extends in −x direction. When the power supplier 858 supplies current to the wire 854 to generate electromagnetic field which moves the bar 852 in +x direction overcoming the elastic force by the spring 860.

Figure 8C:
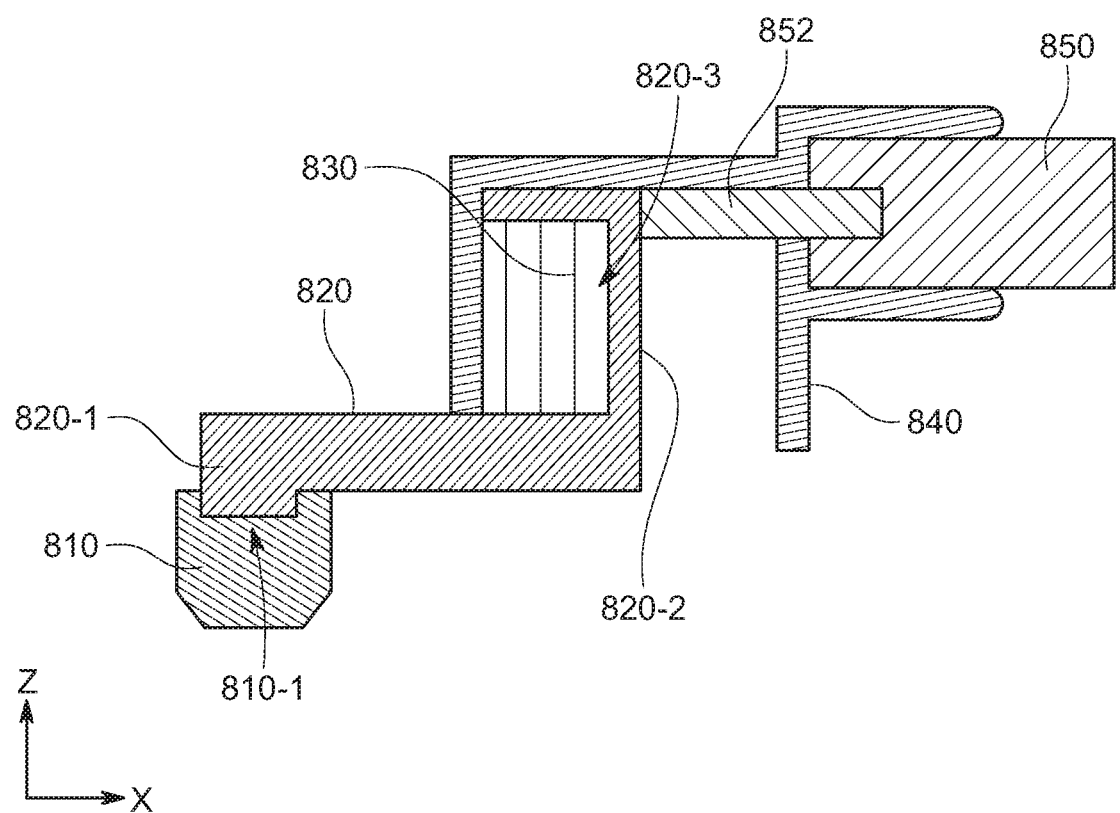
FIG. 8C depicts a cross-section view of an assembled electronic IWE actuator, according to another embodiment shown and described herein.

FIG. 8C depicts a cross-section view of an assembled electronic IWE actuator 800, according to one or more embodiments shown and described herein. The circular L-shaped section 820-1 of the shift fork 820 engages with the bearing groove 810-1 of the clutch ring 810. Once the clutch ring 810 is engaged with the shift fork 820 via the bearing groove 810-1, the clutch ring 810 is configured to rotate around the x-axis guided by the L-shaped section 820-1 of the shift fork 820. The clutch ring 810 may rotate around the x-axis independent of the shift fork 820. That is, the shift fork 820 is fixed at a position while the clutch ring 510 rotates about the x-axis.

The bar 852 of the solenoid 850 engages with the annular base portion 820-2 of the shift fork 820 such that both of the bar 852 and the shift fork 820 move in +x or −x direction integrally. The shift fork return spring 830 is installed between the housing 840 and the groove 820-3 of the shift fork 820. The shift fork return spring 830 exerts elastic force against the shift fork 820 in +x direction. In some embodiments, the electronic IWE actuator 800 may not include the shift fork return spring 830.

Figure 9:
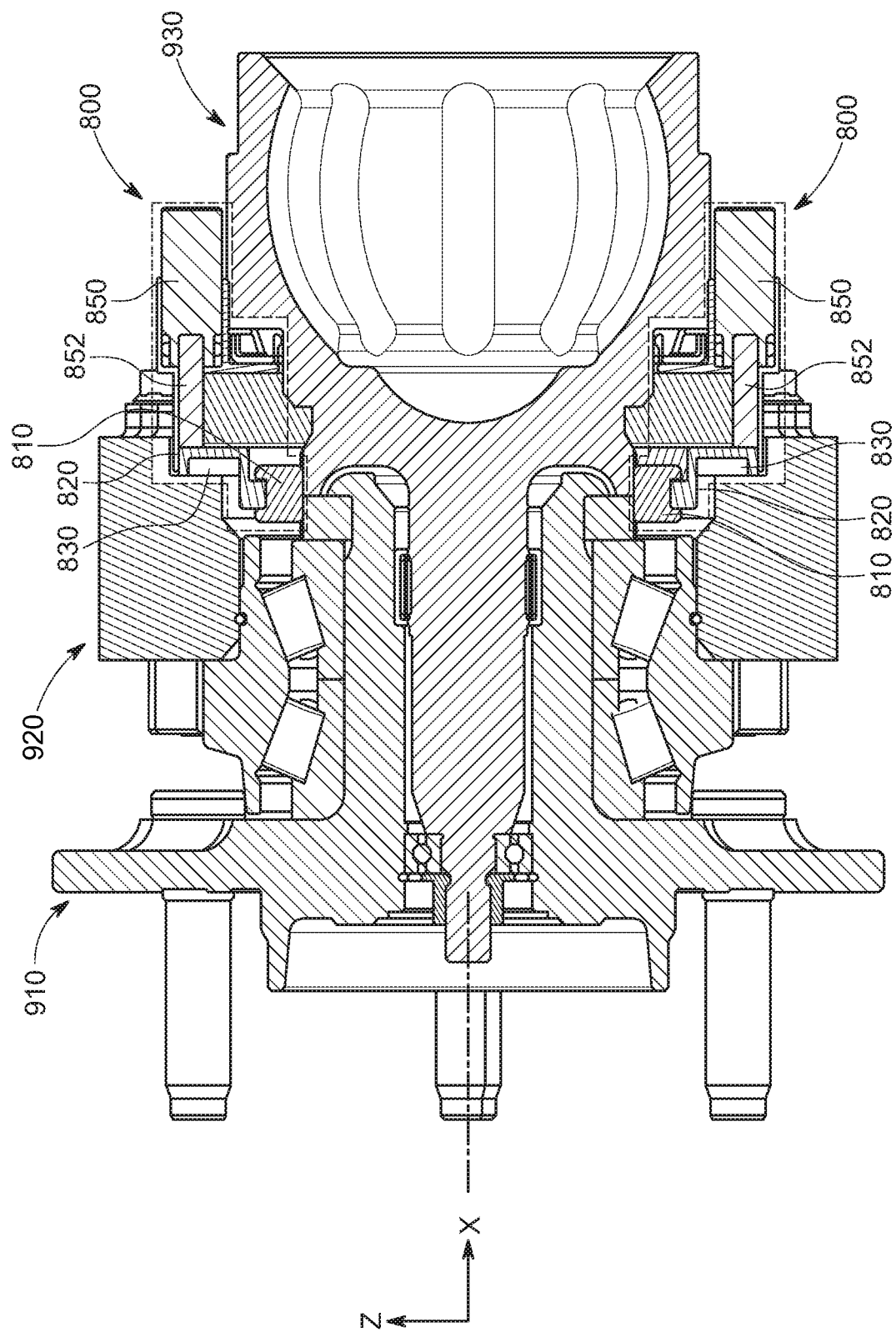
FIG. 9 depicts cross-section view of an electronic IWE actuator installed in a vehicle, according to another embodiment shown and described herein.

FIG. 9 depicts a cross-section view of the electronic IWE actuator 800 installed in a vehicle, according to another embodiment shown and described herein. As shown in FIG. 9, the electronic IWE actuator 800 surrounds a portion of a CV joint 930 and a portion of the wheel hub 910. The CV joint 930 is rotatably supported in the wheel hub 910 which is rotatably supported in a knuckle 920. The clutch ring 810 of the electronic IWE actuator 800 may be slidable between a position of interlocked engagement with one of the wheel hub 910 and the CV joint 930 and a position of interlocked engagement with both of the wheel hub 910 and the CV joint 930. FIG. 9 depicts that the clutch ring 810 is in a position of interlocked engagement with both of the wheel hub 910 and the CV joint 930

In embodiments, as depicted in FIGS. 8C and 9, the circular L-shaped section 820-1 of the shift fork 820 is engaged with the clutch ring 810. A shift fork return spring 830 is disposed between the actuator housing 840 and the shift fork 820 and exerts elastic force against the shift fork 820 in +x direction. Each of the solenoids 850 includes a bar 852 that moves linearly in +x or −x direction by the operation of the solenoid 850. The solenoids 850 may be controlled by the electronic control unit of the vehicle, for example, the electronic control unit 100 in FIG. 1A or 1B. One end of the bar 852 abuts the shift fork 820 such that the bar 852 pushes the shift fork 820 in −x direction when the bar 852 moves in −x direction. FIG. 9 illustrates that the bar 852 moved for the maximum amount in −x direction. The shift fork 820 and the clutch ring 810 move in −x direction as the bar 852 moves in −x direction. In response, the clutch ring 810 is engaged with the wheel hub 910 and the CV joint 930 such that the wheel hub 910 and the CV joint 930 rotate integrally.

Figure 10A:
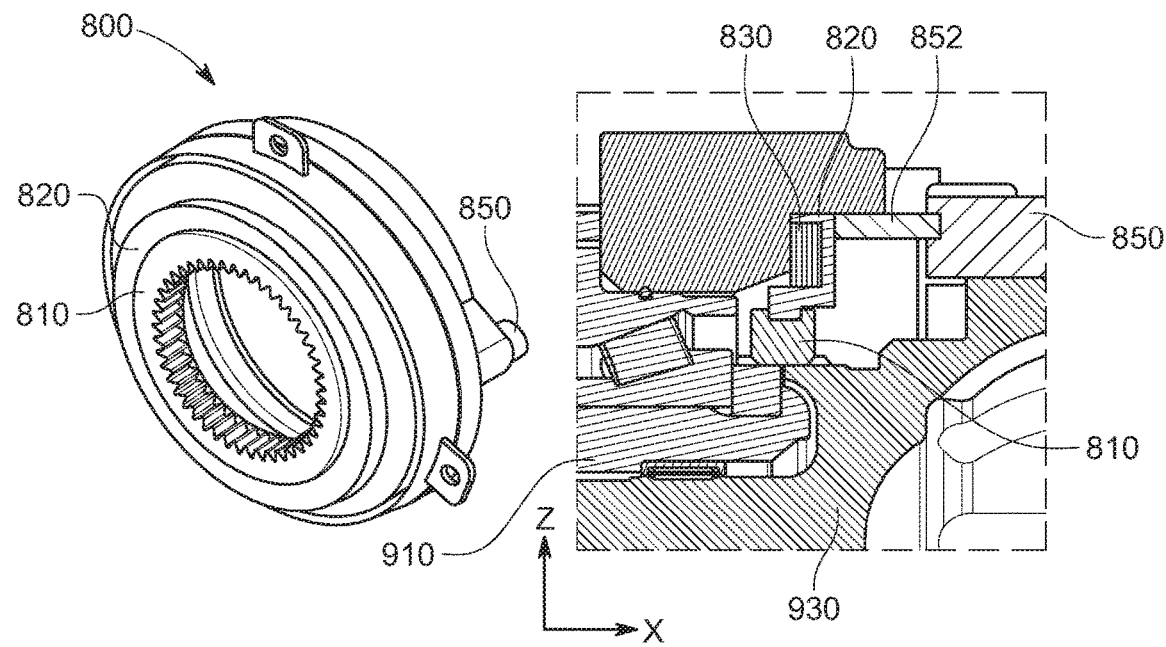
FIG. 10A depicts engagement of the clutch ring with the wheel hub in response to an operation of the solenoid, according to another embodiment shown and described herein.

FIG. 10A depicts engagement of the clutch ring 810 with the wheel hub 910 in response to an operation of the solenoid 850, according to one or more embodiments shown and described herein. The solenoid 850 may be controlled by the electronic control unit of the vehicle, for example, the electronic control unit 100 in FIG. 1A or 1B. As shown in FIG. 10A, the solenoid 850 extends the bar 852 in −x direction to push the shift fork 820 in −x direction. The shift fork 820 and the clutch ring 810 also moves in −x direction in response to the extension of the bar 852. The clutch ring 810 moves to a position of interlocked engagement with both of the wheel hub 910 and the CV joint 930. That is, the clutch ring 810 locks the wheel hub 910 and the CV joint 930 to rotate integrally. The clutch ring 810 rotates freely on the shift fork 820 such that the clutch ring 810 can rotate with the wheel hub 810 while the rest of the electronic IWE actuator 800 remains stationary.

Figure 10B:
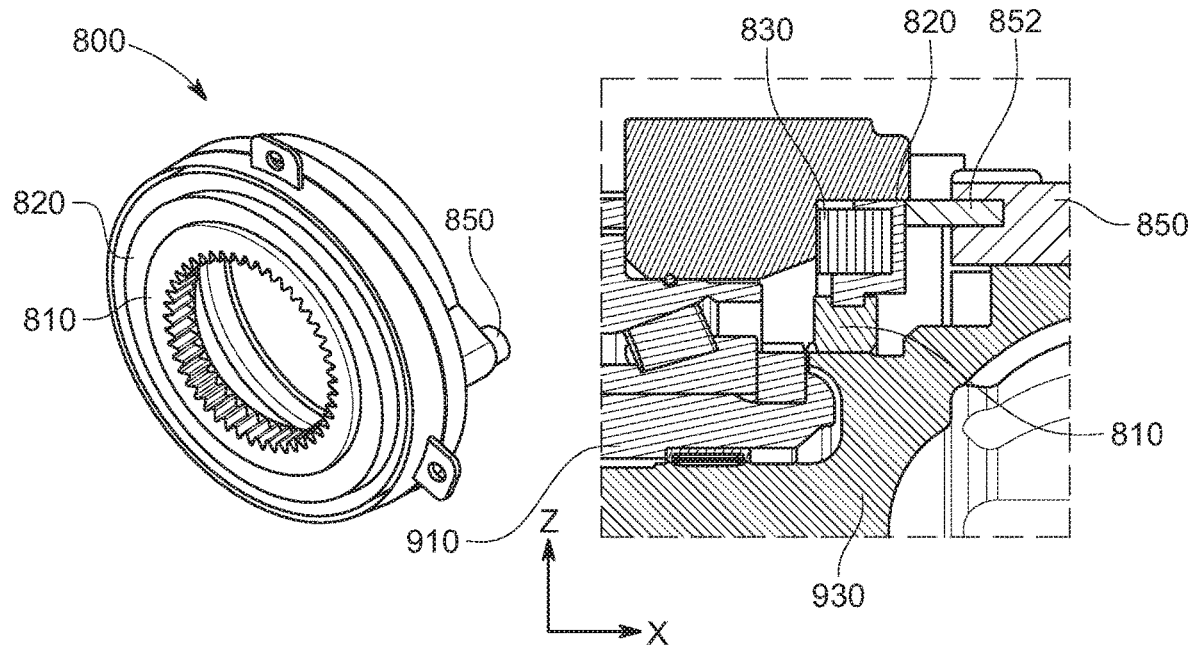
FIG. 10B depicts disengagement of the clutch ring from the wheel hub in response to an operation of the solenoid, according to another embodiment shown and described herein.

FIG. 10B depicts disengagement of the clutch ring 810 from the wheel hub 910 in response to an operation of the solenoid 850, according to one or more embodiments shown and described herein. As shown in FIG. 10B, the solenoid 850 retracts the bar 852 in +x direction. In response, the shift fork 820 may move in +x direction along with the bar 852. For example, the shift fork 820 is attached to the bar 852, and the shift fork 820 and the bar 852 move in +x direction integrally. As another example, the shift fork return spring 830 exert elastic force against the shift fork 820 in +x direction such that the shift fork 820 moves in +x direction. The clutch ring 810 moves in +x direction along with the shift fork 820 because the clutch ring 810 engages with the shift fork 820 via the circular L-shaped section 820-2. Thus, the clutch ring 810 moves to a position of interlocked engagement with the CV joint 930 only. Because the clutch ring 810 does not engage with the wheel hub 910, the wheel hub 910 and the CV joint 930 rotate independently.

In this embodiment, because the solenoids 850 actuate very quickly, the clutch ring 810 of the electronic IWE actuator 800 may swiftly switch between an extended position (i.e., a position where the clutch ring 810 is engaged with the wheel hub 910) and a retracted position (i.e., a position where the clutch ring 810 is disengaged from the wheel hub 910).

In another embodiment, the electronic IWE actuator 800 may not include the shift fork return spring 830. The one end of the bar 852 is coupled to the shift fork 820, and thus, the bar 852 and the shift fork 820 move integrally. Applying power to the solenoid 850 in one direction may cause the bar to extend (i.e., move in −x direction), and thereby placing the clutch ring 810 in an extended position (i.e., a position where the clutch ring 810 is engaged with the wheel hub 910). Reversing the polarity of the power provided to the solenoid 850 may cause the bar 852 to retract (i.e., move in +x direction), and thereby placing the clutch ring 810 in a retracted position (i.e., a position where the clutch ring 810 is disengaged from the wheel hub 910). In this embodiment, a continuous power is provided to the solenoids 850 in both the extended and retracted positions.

Figure 11B:
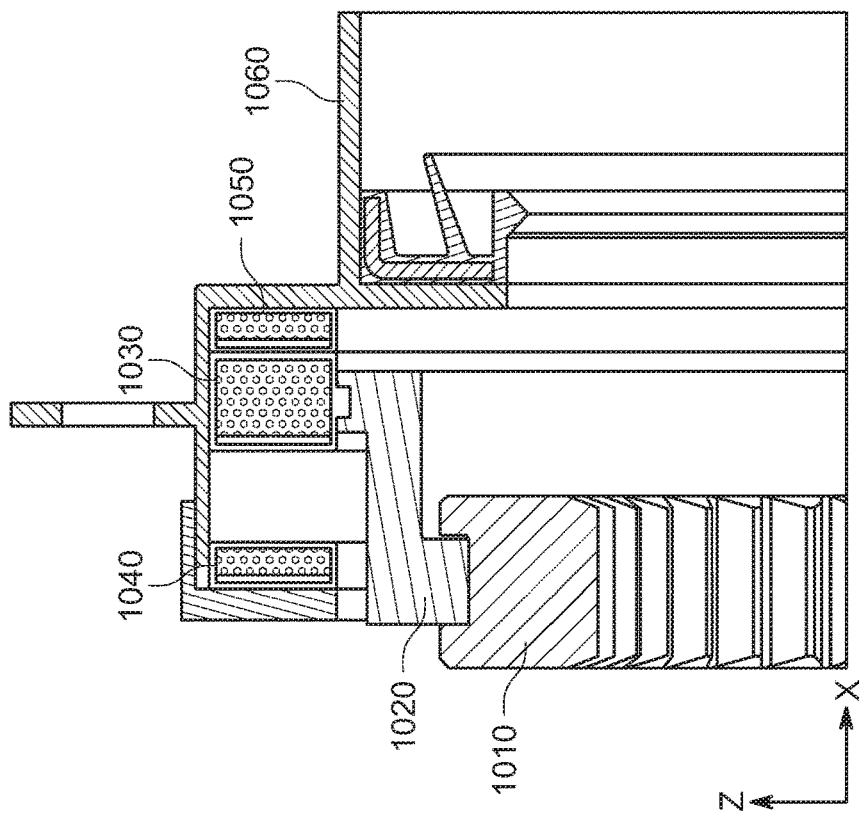
FIG. 11B depicts a cross sectional view of an electronic IWE actuator according to another embodiment shown and described herein.
Figure 11A:
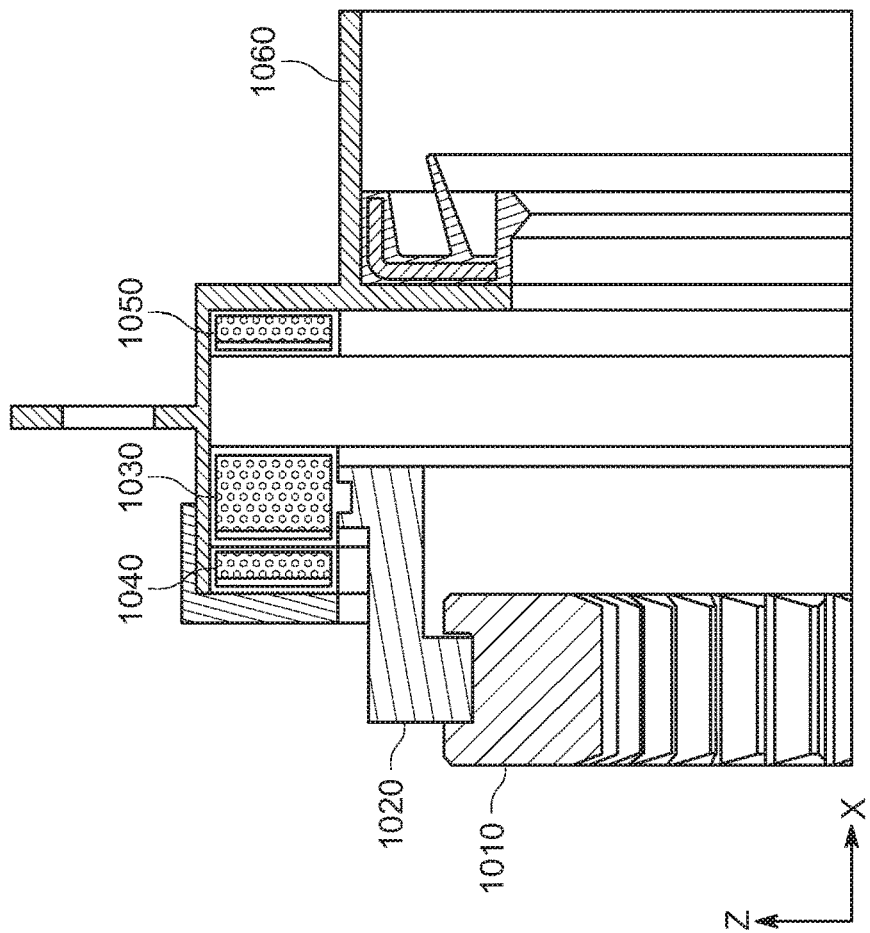
FIG. 11A depicts a cross sectional view of an electronic IWE actuator according to another embodiment shown and described herein.

FIGS. 11A and 11B depict cross sectional views of an electronic IWE actuator 1000 according to another embodiment shown and described herein. The electronic IWE actuator 1000 corresponds to the electronic IWE actuators 130 in FIGS. 1A and 1B. The electronic IWE actuator 1000 includes a clutch ring 1010, a shift fork 1020, a sliding magnet 1030, an outboard stationary magnet 1040, an inboard stationary magnet 1050, and an actuator housing 1060.

The clutch ring 1010 is an annular ring having a bearing groove along the rim of the clutch ring 1010, similar to the clutch ring 210 as shown in FIG. 2. The shift fork 1020 includes an annular base portion and a circular L-shaped section which is engaged with the bearing groove of the clutch ring 1010, similar to the shift fork 220 as shown in FIG. 2.

The outboard stationary magnet 1040 and the inboard stationary magnet 1050 are attached to the actuator housing 1060. The outboard stationary magnet 1040 and the inboard stationary magnet 1050 may be permanent magnets or electromagnets. The sliding magnet 1030 is coupled with the shift fork 1020. The sliding magnet 1030 may be a permanent magnet or an electromagnet.

In embodiments, the outboard stationary magnet 1040 and the inboard stationary magnet 1050 may be permanent magnets, and the sliding magnet 1030 may be an electromagnet. The polarity of the sliding magnet 1030 may be changed. The polarity of the sliding magnet 1030 may be controlled by the electronic control unit of the vehicle, for example, the electronic control unit 100 in FIG. 1A or 1B. For example, the polarity of the sliding magnet 1030 is set such that the sliding magnet 1030 is attracted to the outboard stationary magnet 1040 by the magnetic force between the sliding magnet 1030 and the outboard stationary magnet 1040, as shown in FIG. 11A. When the polarity of the sliding magnet 1030 is reversed, the sliding magnet 1030 is attracted to the inboard stationary magnet 1050 by the magnetic force between the sliding magnet 1030 and the inboard stationary magnet 1050, as shown in FIG. 11B. In some embodiments, a shift fork return spring (not shown in FIGS. 11A and 11B) may be disposed between the shift fork 1020 and the actuator housing 1060. The shift fork return spring exert elastic force against the shift fork 1020 in −x direction. Thus, when no power is applied to the sliding magnet 1030, the shift fork return spring pushes the shift fork 1020 in −x direction such that the clutch ring 1010 is in an extended position (i.e., a position where the clutch ring 1010 is engaged with a wheel hub). When power is applied to the sliding magnet 1030, the magnetic force between the sliding magnet 1030 and the inboard stationary magnet 1050 overcomes the elastic force exerted by the shift fork return spring.

In another embodiment, the outboard stationary magnet 1040 and the inboard stationary magnet 1050 may be electromagnets, and the sliding magnet 1030 may be a permanent magnet. The polarities of the outboard stationary magnet 1040 and the inboard stationary magnet 1050 may be changed. The polarities of the outboard stationary magnet 1040 and the inboard stationary magnet 1050 may be controlled by the electronic control unit of the vehicle, for example, the electronic control unit 100 in FIG. 1A or 1B. For example, the polarities of the outboard stationary magnet 1040 and the inboard stationary magnet 1050 are set such that the sliding magnet 1030 is attracted to the outboard stationary magnet 1040 by the magnetic force between the sliding magnet 1030 and the outboard stationary magnet 1040, as shown in FIG. 11A. When the polarities of the outboard stationary magnet 1040 and the inboard stationary magnet 1050 are reversed, the sliding magnet 1030 is attracted to the inboard stationary magnet 1050 by the magnetic force between the sliding magnet 1030 and the inboard stationary magnet 1050, as shown in FIG. 11B.

It should be understood that the present electronic IWE actuator does not require a vacuum pump, valves, reservoirs, vacuum lines and other vacuum components to operate. The electronic IWE actuator includes an electric motor, a worm gear connected to the electric motor, a ball ramp including a worm wheel configured to engage with the worm gear, a clutch ring configured to engage with a wheel hub of the vehicle, and a shift fork configured to engage with the clutch ring and the ball ramp and move linearly in a direction along an axis of the wheel hub in response to a rotation of the ball ramp. The clutch ring is configured to engage with the wheel hub in response to a rotation of the worm gear in a first direction, and disengage from the wheel hub in response to a rotation of the worm gear in a second direction that is opposite to the first direction. The ball ramp includes a first annular plate including one or more ramped grooves, a second annular plate including one or more ramped grooves and the worm wheel, and a ball plate including one or more balls configured to be retained in the ramped grooves of the first plate and the second plate.

The electronic IWE actuator requires fewer components, and thus, is less complex than the conventional vacuum powered IWE system. Since no vacuum pump is required, the electronic IWE actuator may be used in electric vehicle applications where a vacuum pump is typically not available. In addition, the present electronic IWE actuator has greater reliability and lower warranty costs due to the elimination of vacuum lines.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electronic integrated wheel end actuator for a vehicle, comprising:
   an electric motor;
   a worm gear connected to the electric motor;

a ball ramp including a worm wheel configured to engage with the worm gear;

a clutch ring including an annular bearing groove and configured to engage with a wheel hub of the vehicle; and a shift fork including a circular L-shaped section configured to engage with the annular bearing groove of the clutch ring and an annular base portion configured to abut the ball ramp and move linearly in a direction along an axis of the wheel hub in response to a rotation of the ball ramp.

2. The electronic integrated wheel end actuator of claim 1, wherein the clutch ring is configured to:

engage with the wheel hub in response to a rotation of the worm gear in a first direction; and disengage from the wheel hub in response to a rotation of the worm gear in a second direction opposite to the first direction.

3. The electronic integrated wheel end actuator of claim 1, wherein the ball ramp comprises:

a first annular plate including one or more ramped grooves;

a second annular plate including one or more ramped grooves and the worm wheel; and a ball plate including one or more balls configured to be retained in the ramped grooves of the first annular plate and the second annular plate.

4. The electronic integrated wheel end actuator of claim 3, wherein the second annular plate move in the direction in response to the rotation of the second annular plate.

5. The electronic integrated wheel end actuator of claim 4, wherein the shift fork and the second annular plate move integrally in the direction in response to the rotation of the second annular plate.

6. The electronic integrated wheel end actuator of claim 3, wherein the worm wheel comprises cut teeth along a portion of an outer surface of the worm wheel.

7. The electronic integrated wheel end actuator of claim 1, further comprising:

an actuator housing configured to retain the ball ramp; and a ball ramp return spring disposed between the ball ramp and the actuator housing.

8. The electronic integrated wheel end actuator of claim 1, further comprising:

an actuator housing configured to retain the ball ramp; and a shift fork return spring disposed between the shift fork and the actuator housing.

* * * * *